United States Patent
Kobayashi et al.

(10) Patent No.: US 10,978,107 B2
(45) Date of Patent: Apr. 13, 2021

(54) INFORMATION PROCESSING APPARATUS, OPTICAL STORAGE APPARATUS, AND METHOD FOR PROCESSING INFORMATION

(71) Applicant: SONY CORPORATION, Tokyo (JP)

(72) Inventors: Nobuyoshi Kobayashi, Kanagawa (JP); Junya Shiraishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 207 days.

(21) Appl. No.: 16/304,873

(22) PCT Filed: May 1, 2017

(86) PCT No.: PCT/JP2017/017116
§ 371 (c)(1),
(2) Date: Nov. 27, 2018

(87) PCT Pub. No.: WO2017/208721
PCT Pub. Date: Dec. 7, 2017

(65) Prior Publication Data
US 2020/0327906 A1    Oct. 15, 2020

(30) Foreign Application Priority Data
May 31, 2016   (JP) .............................. JP2016-108412

(51) Int. Cl.
*G11B 7/00*    (2006.01)
*G11B 20/10*   (2006.01)
(Continued)

(52) U.S. Cl.
CPC ........ *G11B 20/10046* (2013.01); *G11B 7/005* (2013.01); *G11B 7/13* (2013.01); *G11B 20/10314* (2013.01)

(58) Field of Classification Search
None
See application file for complete search history.

(56) References Cited

U.S. PATENT DOCUMENTS 5,250,796 A * 10/1993 Taguchi ................. G11B 7/126
250/205
6,026,071 A *  2/2000 Kimura .................. G11B 7/005
369/116
(Continued)

FOREIGN PATENT DOCUMENTS

CN         1691185 A    11/2005
CN       106575512 A     4/2017
(Continued)

OTHER PUBLICATIONS

International Search Report and Written Opinion of PCT Application No. PCT/JP2017/017116, dated Aug. 1, 2017, 06 pages of English Translation and 06 pages of ISRWO.
(Continued)

*Primary Examiner* — Peter Vincent Agustin
(74) *Attorney, Agent, or Firm* — Chip Law Group

(57) ABSTRACT

An apparatus comprises a photodetector (PD) that irradiates a disk with laser light and outputs a signal based on a reflected light from the disk, a front monitor that outputs a reference signal based on an emitted light of a laser diode, and a data detection processing unit to which an output signal of the PD is input to generate a reproduction signal. The data detection processing unit includes a reproduction signal adaptive equalizer that outputs an equalization signal by adaptive equalization processing based on the PD output signal, and a laser noise adaptive equalizer that outputs the equalization signal by the adaptive equalization processing based on a laser noise signal, and generates the reproduction signal in which the laser noise is reduced on the basis of an arithmetic operation result of the output of the reproduction signal adaptive equalizer and the output of the laser noise adaptive equalizer.

16 Claims, 14 Drawing Sheets

(51) Int. Cl.
*G11B 7/005* (2006.01)
*G11B 7/13* (2012.01)

(56) References Cited

U.S. PATENT DOCUMENTS

| | | | |
|---|---|---|---|
| 6,115,333 A * | 9/2000 | Igarashi | G11B 7/0945 369/44.27 |
| 2005/0193318 A1* | 9/2005 | Okumura | G11B 20/10481 714/795 |
| 2005/0265200 A1 | 12/2005 | Fukutomi et al. | |
| 2006/0083135 A1* | 4/2006 | Minemura | G11B 20/10046 369/47.51 |
| 2006/0114777 A1* | 6/2006 | Watanabe | G11B 7/128 369/47.1 |
| 2008/0112289 A1* | 5/2008 | Nishimura | G11B 20/10009 369/53.3 |
| 2009/0296553 A1* | 12/2009 | Yamakawa | G11B 20/10009 369/59.23 |
| 2014/0341006 A1* | 11/2014 | Miyashita | G11B 20/12 369/30.18 |
| 2017/0133049 A1 | 5/2017 | Nishi et al. | |

FOREIGN PATENT DOCUMENTS

| | | |
|---|---|---|
| EP | 1589536 A2 | 10/2005 |
| JP | 2002-183970 A | 6/2002 |
| JP | 2005-310218 A | 11/2005 |
| JP | 2005-322367 A | 11/2005 |
| JP | 2006-079772 A | 3/2006 |
| KR | 10-2006-0046642 A | 5/2006 |
| WO | 2016/006157 A1 | 1/2016 |

OTHER PUBLICATIONS

International Preliminary Report on Patentability of PCT Application No. PCT/JP2017/017116, dated Dec. 13, 2018, 06 pages of English Translation and 04 pages of IPRP.

Office Action in JP 2018-520737 dated Oct. 25, 2018.

* cited by examiner

INFORMATION PROCESSING APPARATUS, OPTICAL STORAGE APPARATUS, AND METHOD FOR PROCESSING INFORMATION

CROSS REFERENCE TO RELATED APPLICATIONS

This application is a U.S. National Phase of International Patent Application No. PCT/JP2017/0017116 filed on May 1, 2017, which claims priority benefit of Japanese Patent Application No. JP 2016-108412 filed in the Japan Patent Office on May 31, 2016. Each of the above-referenced applications is hereby incorporated herein by reference in its entirety.

TECHNICAL FIELD

The present disclosure relates to an information processing apparatus, an optical storage apparatus, and a method for processing information, and a program. More particularly, the present disclosure relates to an information processing apparatus, an optical storage apparatus, a method for processing information, and a program that implement high-quality data reproduction from a disk on which high-density data recording has been performed.

BACKGROUND ART

Optical disks such as a digital versatile disc (DVD) and a Blu-ray (registered trademark) disc (BD) are widely used as media for recording various data such as an image and a program.

Those optical disks such as a BD are required to perform high-density information recording.

Examples of a method for increasing density of the optical disk include a method in which a channel bit length, that is, a mark length is shortened and the density in a linear density direction is increased, and a method in which a track pitch is narrowed.

Processing in which laser light is emitted to analyze light reflected from the disk is performed to reproduce the optical disk. However, noise included in the emitted laser light itself, which is what is called laser noise, contributes to degradation of quality of a reproduction signal.

For example, Patent Document 1 (Japanese Patent Application Laid-Open No. 2005-322367), Patent Document 2 (Japanese Patent Application Laid-Open No. 2002-183970), Patent Document 3 (Japanese Patent Application Laid-Open No. 2006-79772), and the like disclose conventional techniques for removing laser noise included in a reproduction signal.

Patent Document 1 discloses a processing configuration for reducing noise to which a method of analog division is applied.

Further, Patent Document 2 discloses a processing configuration for reducing noise to which a method of analog multiplication is applied.

Furthermore, Patent Document 3 discloses a processing configuration for reducing noise to which a method of a transversal filter adaptive feedback is applied.

However, those conventional techniques may have problems in terms of feasibility of a wide band analog dividing circuit and multiplying circuit, and of a delay adjusting circuit, which are for exhibiting a sufficient noise reducing effect.

CITATION LIST

Patent Document

Patent Document 1: Japanese Patent Application Laid-Open No. 2005-322367
Patent Document 2: Japanese Patent Application Laid-Open No. 2002-183970
Patent Document 3: Japanese Patent Application Laid-Open No. 2006-79772

SUMMARY OF THE INVENTION

Problems to be Solved by the Invention

The present disclosure has been conceived, for example, in view of the problems described above, and an object of the present disclosure is to provide an information processing apparatus, an optical storage apparatus, a method for processing information, and a program that reduce laser noise included in a reproduction signal of an optical disk and implement acquisition of a high-quality reproduction signal, for example.

Solutions to Problems

According to a first aspect of the present disclosure,
an information processing apparatus includes:
a photodetector that outputs a signal based on reflected light from a disk with respect to light emitted from a laser diode;
a front monitor that outputs a reference signal based on the light emitted from the laser diode;
and a data detection processing unit to which an output signal of the photodetector is input, which generates a reproduction signal,
in which the data detection processing unit includes:
a reproduction signal adaptive equalizer to which the output signal of the photodetector is input, which outputs an equalization signal by adaptive equalization processing based on an input signal;
a laser noise adaptive equalizer to which a laser noise signal included in the reference signal output from the front monitor is input, which outputs the equalization signal by the adaptive equalization processing based on the input signal;
a computing unit that executes arithmetic operation on an output of the reproduction signal adaptive equalizer and an output of the laser noise adaptive equalizer; and
a signal identification unit that generates an identifying signal on the basis of an output of the computing unit.

Further, according to a second aspect of the present disclosure,
a method for processing information executed in an information processing apparatus includes:
processing of outputting a signal based on reflected light from a disk with respect to light emitted from a laser diode using a photodetector;
processing of outputting a reference signal based on the light emitted from the laser diode using a front monitor; and
executing data detection processing by inputting an output signal of the photodetector to a data detection processing unit and generating a reproduction signal using the data detection processing unit, in which in the data detection processing, the data detection processing unit executes:

processing of generating an equalization signal corresponding to a reproduction signal by an adaptive equalization processing based on the output signal of the photodetector;

processing of generating an equalization signal corresponding to laser noise by the adaptive equalization processing based on a laser noise signal included in the reference signal output from the front monitor;

arithmetic operation of the equalization signal corresponding to the reproduction signal and the equalization signal corresponding to the laser noise; and processing of generating an identifying signal based on the arithmetic operation result.

In addition, according to a third aspect of the present disclosure, a program for causing an information processing apparatus to execute information processing, the information processing apparatus including:

a photodetector that outputs a signal based on reflected light from a disk with respect to light emitted from a laser diode;

a front monitor that outputs a reference signal based on the light emitted from the laser diode; and a data detection processing unit to which an output signal of the photodetector is input, which generates a reproduction signal and executes data detection processing, the program causes the data detection processing unit to execute:

processing of generating an equalization signal corresponding to a reproduction signal by an adaptive equalization processing based on the output signal of the photodetector;

processing of generating an equalization signal corresponding to laser noise by the adaptive equalization processing based on a laser noise signal included in the reference signal output from the front monitor;

arithmetic operation of the equalization signal corresponding to the reproduction signal and the equalization signal corresponding to the laser noise; and processing of generating an identifying signal based on the arithmetic operation result.

Note that the program according to the present disclosure is a program that can be provided by a storage medium or a communication medium provided in a computer readable format to an information processing apparatus or a computer system that can execute various program codes, for example. By providing such a program in the computer readable format, processing corresponding to the program is implemented on the information processing apparatus or the computer system.

Other objects, features, and advantages of the present disclosure will become apparent from further detailed descriptions based on examples of the present disclosure and the accompanying drawings to be described later. Note that, in the descriptions, the term "system" refers to a logical group configuration of a plurality of devices, and is not limited to a system in which the devices of each configuration are in the same housing.

Effects of the Invention

According to a configuration of an example of the present disclosure, an apparatus and a method for generating a reproduction signal in which laser noise is reduced are obtained.

Specifically, there are provided a photodetector (PD) that irradiates a disk with laser light and outputs a signal based on a reflected light from the disk, a front monitor that outputs a reference signal based on an emitted light of a laser diode, and a data detection processing unit to which an output signal of the PD is input to generate a reproduction signal. The data detection processing unit includes a reproduction signal adaptive equalizer that outputs an equalization signal by adaptive equalization processing based on the PD output signal, and a laser noise adaptive equalizer that outputs the equalization signal by the adaptive equalization processing based on a laser noise signal, and generates the reproduction signal in which the laser noise is reduced on the basis of an arithmetic operation result of the output of the reproduction signal adaptive equalizer and the output of the laser noise adaptive equalizer.

According to the present configuration, the apparatus and the method for generating the reproduction signal in which laser noise is reduced are obtained.

Note that effects described in the descriptions are merely examples that are not limited thereto, and may have additional effects.

MODE FOR CARRYING OUT THE INVENTION

Hereinafter, an information processing apparatus, an optical storage apparatus, a method for processing information, and a program according to the present disclosure will be described in detail with reference to the accompanying drawings. Note that descriptions will be made according to the following items.

1. Configuration of information processing apparatus and exemplary reproducing processing
   1-1. Exemplary configuration of optical pickup
   1-2. Exemplary configuration of data detection processing unit
2. Configuration for reducing laser noise of optical pickup included in reproduction signal
3. Configuration and processing for reducing laser noise in reproduction signal
   3-1. (Example 1) Example of information processing apparatus for reducing laser noise in reproduction signal
   3-2. (Example 2) Example of information processing apparatus for reducing laser noise in reproduction signal
   3-3. (Example 3) Example of information processing apparatus having 2T sampling configuration for reducing laser noise in reproduction signal
   3-4. (Example 4) Example of information processing apparatus having 2T sampling configuration for reducing laser noise in reproduction signal
   3-5. (Example 5) Example of information processing apparatus having 1T sampling configuration for reducing laser noise in reproduction signal
   3-6. (Example 6) Example of information processing apparatus having 1T sampling configuration for reducing laser noise in reproduction signal
4. Other examples
5. Summary of configurations in present disclosure

1. CONFIGURATION OF INFORMATION PROCESSING APPARATUS AND EXEMPLARY REPRODUCING PROCESSING

First, a configuration and exemplary processing of the information processing apparatus that executes data recording/reproducing processing to which an optical disk such as a Blu-ray (registered trademark) disc (BD) is applied will be described.

Figure 1:
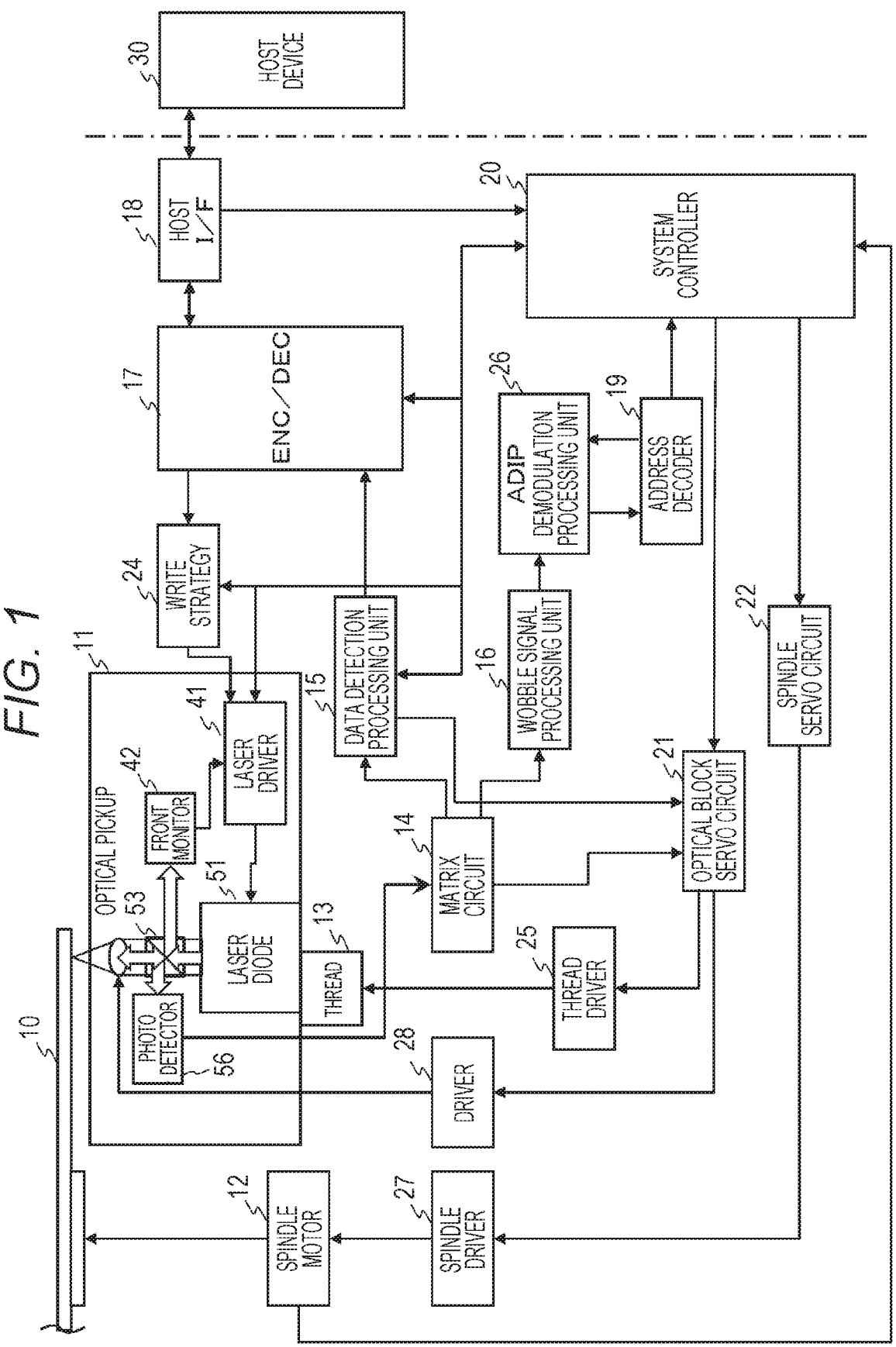
FIG. 1 is a diagram illustrating an exemplary configuration of an information processing apparatus.

FIG. 1 is a block diagram illustrating an exemplary configuration of the information processing apparatus such as an optical storage apparatus that executes data reproducing/recording processing from/to an optical disk 10.

As illustrated in FIG. 1, the information processing apparatus includes an optical pickup 11 that records/reproduces information on/from the optical disk 10 as an optical recording medium, and a spindle motor 12 that rotates the optical disk 10.

A thread (feed motor) 13 is provided to move the optical pickup 11 in the radial direction of the optical disk 10.

The optical disk 10 is, for example, a high-density optical disk such as a Blu-ray (registered trademark) disc (BD).

The BD is, for example, a high-density optical disk having a recording capacity of about 25 GB for one layer on one side and about 50 GB for two layers on one side.

It should be noted that, in the BD standard, a light source wavelength is set to 405 nm and a numerical aperture (NA) of an objective lens is increased to 0.85 to reduce a beam spot diameter. According to the BD standard, the spot diameter can be reduced to 0.58 µm.

Further, in recent years, a BDXL (registered trademark) in which a channel bit length, that is, a mark length is shortened and the density in a linear density direction is increased so that a large capacity of 100 GB for three layers and 128 GB for four layers is achieved has been put into practical use relative to the Blu-ray (registered trademark) disc (BD).

Furthermore, a method of recording data on both a groove track and a land track (method of land/groove recording) has also been adopted in order to increase the recording capacity.

Here, a groove set along a recording track of the disk is a groove (G), and a track formed by the groove is referred to as a groove track.

Besides, an area to be a mountain portion sandwiched between two grooves is a land (L), and a track formed by the land is referred to as a land track.

In a high-density recording disk, data is recorded in both the groove (G) and the land (L). With this configuration, more data can be recorded on the disk.

However, with such a high-density recording disk, there is a problem that the possibility of occurrence of crosstalk in data reproducing processing increases.

That is, there is a problem that the crosstalk in which data of an adjacent track is mixed as noise is likely to occur in read data of a read target track.

When the optical disk 10 is loaded in the information processing apparatus, it is rotationally driven at a constant linear velocity (CLV) or a constant angular velocity (CAV) by the spindle motor 12 at the time of recording/reproduction.

In order to align a phase of a wobble groove in the radial direction of the optical disk 10, the CAV or a zone CAV is preferable.

At the time of reproduction, mark information recorded on a track on the optical disk 10 is read by the optical pickup (optical head) 11.

At the time of recording data on the optical disk 10, user data is recorded, by the optical pickup 11, on the track on the optical disk 10 as a change in brightness (reflectance) and reflection phase (complex reflectance) such as a phase change mark and a dye change mark.

In the case of a recordable disk, the phase change mark as a recording mark is recorded on the track formed by a wobbling groove while the phase change mark is recorded using a run-length limited (RLL) (1, 7) parity preserve (PP) method of modulation/prohibit repeated minimum transition run-length (rmtr) and the like, with linear density of 0.12 µm/bit and 0.08 µm/channel bit in the case of a BD of 23.3 GB per layer.

Similarly, depending on a disk type, recording is performed at a density corresponding to the channel bit length, for example, 0.0745 µm/channel bit in the case of a BD of 25 GB/layer, 0.05826 µm/channel bit in the case of a BDXL (registered trademark) of 32 GB/layer, and 0.05587 µm/channel bit in the case of a BDXL (registered trademark) of 33.4 GB/layer.

Assuming that a channel clock period is "T", the mark length is 2T to 8T.

In the case of a read-only disk, while no groove is formed, data modulated similarly using the RLL (1, 7) PP method of modulation is recorded as an embossed pit array.

In the inner circumference area or the like of the optical disk 10, for example, physical information of the disk and the like is recorded as read-only management information by the embossed pit or the wobbling groove.

The information mentioned above is also read by the optical pickup 11.

Moreover, ADIP information embedded as the wobbling of the groove track on the optical disk 10 is also read by the optical pickup 11.

The optical pickup 11 includes a laser diode 51 that serves as a laser light source, a laser driver 41 that supplies driving current to the laser diode 51, a polarizing beam splitter 53 that guides light emitted from the laser diode 51 and reflected light from the disk 10 with respect to an optical path, a front monitor 42 that obtains a monitoring signal (reference light) of the light emitted from the laser diode 51 and generates a feedback control signal for the laser driver 41, and the like.

Further, a photodetector 56 that detects the reflected light from the disk 10, an objective lens that serves as an output end of the laser light, an optical system that irradiates a recording surface of the disk with the laser light through the objective lens and guides the reflected light to the photodetector, and the like are provided.

In the optical pickup 11, the objective lens is movably held in the tracking direction and the focusing direction by a biaxial mechanism.

The entire optical pickup 11 is made movable in the disk radial direction by a thread mechanism 13.

The driving current from the laser driver 41 is supplied to the laser diode of the optical pickup 11, and the laser diode generates a laser.

The reflected light from the optical disk 10 is detected by the photodetector, converted into an electric signal corresponding to the amount of received light, and supplied to a matrix circuit 14.

The matrix circuit 14 includes a current-voltage conversion circuit, a matrix operation/amplification circuit, and the like corresponding to the current output from a plurality of light receiving elements as a photodetector, and generates a necessary signal by matrix operation processing.

In consideration of signal transmission quality, the current-voltage conversion circuit may be formed in a photodetector element.

For example, a reproduction information signal (RF signal) corresponding to reproduction data, a focus error signal for servo control, a tracking error signal, and the like are generated.

Moreover, a push-pull signal is generated as a signal related to the wobbling of the groove, that is, a signal for detecting the wobbling.

The reproduction information signal output from the matrix circuit 14 is supplied to a data detection processing unit 15, the focus error signal and the tracking error signal are supplied to an optical block servo circuit 21, and the push-pull signal is supplied to a wobble signal processing unit 16.

The data detection processing unit 15 performs binarization processing on the reproduction information signal.

For example, the data detection processing unit 15 performs A/D conversion processing of the RF signal, reproduction clock generation processing using a PLL, partial response (PR) equalization processing, Viterbi decoding (maximum likelihood decoding), and the like, and a binary data string is obtained by performing partial response maximum likelihood decoding (method of partial response maximum likelihood detection: PRML detection).

The data detection processing unit 15 supplies the binary data string as information read from the optical disk 10 to an encoding/decoding unit 17 to be described later.

The encoding/decoding unit 17 performs demodulation of the reproduction data at the time of reproduction and modulation processing of recording data at the time of recording.

That is, data demodulation, deinterleaving, ECC decoding, address decoding, and the like are performed at the time of reproduction, and ECC encoding, interleaving, data modulation, and the like are performed at the time of recording.

At the time of reproduction, the binary data string decoded by the data detection processing unit 15 is supplied to the encoding/decoding unit 17.

The encoding/decoding unit 17 performs demodulation processing on the binary data string to obtain reproduction data from the optical disk 10.

For example, the demodulation processing is performed on the data recorded on the optical disk 10, which has been subject to the run-length limited code modulation such as the RLL (1, 7) PP modulation, and ECC decoding processing for error correction is performed, thereby obtaining the reproduction data from the optical disk 10.

The data decoded to the reproduction data by the encoding/decoding unit 17 is transferred to a host interface 18, and transferred to a host device 30 on the basis of an instruction from a system controller 20.

The host device 30 is, for example, a computer device, an audio-visual (AV) system device, or the like.

At the time of recording/reproduction on the optical disk 10, processing of the ADIP information is performed.

That is, the push-pull signal output from the matrix circuit 14 as the signal related to the wobbling of the groove is made into digitized wobble data in the wobble signal processing circuit 16.

A clock synchronized with the push-pull signal by PLL processing is generated.

In an ADIP demodulation processing unit 26, the wobble data is demodulated into a data stream constituting an ADIP address and supplied to an address decoder 19.

The address decoder 19 decodes the supplied data, obtains an address value, and supplies it to the system controller 20.

The recording data transferred from the host device 30 at the time of recording is supplied to the encoding/decoding unit 17 via the host interface 18.

The encoding/decoding unit 17 performs, as encode processing of the recording data, error correction code addition (ECC encoding), interleaving, sub code addition, and the like.

The run-length limited code modulation such as the RLL (1, 7) PP method is applied to the data having been subject to the processing mentioned above.

The recording data processed by the encoding/decoding unit 17 is supplied to a write strategy unit 24.

In the write strategy unit 24, as recording compensation processing, a laser driving pulse waveform is adjusted with respect to characteristics of a recording layer, a spot shape of laser light, a recording linear velocity, and the like.

Then, a laser driving pulse is output to the laser driver 41.

The laser driver 41 causes current to flow through the laser diode in the optical pickup 11 on the basis of the laser driving pulse having been subject to the recording compensation processing, and performs laser emission.

As a result, a mark corresponding to the recording data is formed on the optical disk 10.

The optical block servo circuit 21 generates various servo drive signals of focus, tracking, and thread from the focus error signal and the tracking error signal from the matrix circuit 14 to execute servo operation.

That is, a focus drive signal and a tracking drive signal are generated corresponding to the focus error signal and the tracking error signal, and a driver 28 drives a focus coil and a tracking coil of the biaxial mechanism in the optical pickup 11.

Accordingly, a tracking servo loop and a focus servo loop are formed by the optical pickup 11, the matrix circuit 14, the optical block servo circuit 21, the driver 28, and the biaxial mechanism.

Further, the optical block servo circuit 21 turns off the tracking servo loop in response to a track jump command from the system controller 20, and outputs a jump drive signal, thereby causing track jump operation to be executed.

Furthermore, the optical block servo circuit 21 generates a thread drive signal on the basis of a thread error signal obtained as a low frequency component of the tracking error signal, access execution control by the system controller 20, and the like, and the thread mechanism 13 is driven by a thread driver 25.

The spindle servo circuit 22 performs control to rotate the spindle motor 12 according to a CLV rotation or a CAV rotation.

The spindle servo circuit 22 obtains the clock generated by the PLL with respect to the wobble signal as current rotational velocity information of the spindle motor 12, and compares it with predetermined reference velocity information, thereby generating a spindle error signal.

Moreover, at the time of data reproduction, since the reproduction clock generated by the PLL in the data detection processing unit 15 becomes the current rotational velocity information of the spindle motor 12, the spindle error signal is generated by comparing it with the predetermined reference velocity information.

Then, the spindle servo circuit 22 outputs a spindle drive signal generated corresponding to the spindle error signal, and causes a spindle driver 27 to execute the CLV rotation or the CAV rotation of the spindle motor 12.

The spindle servo circuit 22 causes the spindle drive signal to be generated in response to a spindle kick/brake control signal from the system controller 20, and also causes the operation of the spindle motor 12 such as a start, stop, acceleration, and deceleration to be executed.

Such various operations of a servo system and a recording and reproduction system described above are controlled by the system controller 20 formed by a microcomputer.

The system controller 20 executes various kinds of processing in response to a command from the host device 30 given via the host interface 18.

For example, when a writing instruction (write command) is issued from the host device 30, the system controller 20 first moves the optical pickup 11 to the address to be written.

Then, the encoding/decoding unit 17 is caused to execute the encode processing as described above on the data transferred from the host device 30 (e.g., video data, audio data, and the like).

Subsequently, recording is executed by the laser emission being driven by the laser driver 41 corresponding to the encoded data.

Further, for example, in a case where a read command for requesting transfer of a certain data recorded in the optical disk 10 is supplied from the host device 30, the system controller 20 first performs seek operation control with the aim of the instructed address.

That is, the command is issued to the optical block servo circuit 21, and an access operation of the optical pickup 11 targeting the address specified by a seek command is executed.

Subsequently, the operation control necessary for transferring the data in the instructed section to the host device 30 is performed.

That is, data is read from the optical disk 10, the data detection processing unit 15 and the encoding/decoding unit 17 are caused to execute the reproduction processing, and the requested data is transferred.

Here, although an optical disk device to be connected to the host device 30 is described in the example of FIG. 1, the optical disk device may not be connected to other devices.

In that case, an operation unit and a display unit are provided, and a configuration of an interface portion for data input/output is made different from that in FIG. 1.

That is, while recording and reproduction are performed in response to an operation of the user, a terminal portion for inputting/outputting various data is to be formed.

There are obviously various other exemplary configurations of the optical disk device.

1-1. Exemplary Configuration of Optical Pickup

Next, a specific exemplary configuration of the optical pickup 11 used in the optical disk device described above will be described with reference to FIG. 2.

The optical pickup 11 records information on the optical disk 10 using, for example, a laser light (beam) having a wavelength $\lambda$ of 405 nm, and reproduces information from the optical disk 10.

As described above with reference to FIG. 1, the optical pickup 11 includes the laser diode 51 that serves as a laser light source, the laser driver 41 that supplies driving current to the laser diode 51, the polarizing beam splitter 53 that guides light emitted from the laser diode 51 and reflected light from the disk 10 with respect to an optical path, the front monitor 42 that obtains the monitoring signal (reference light) of the light emitted from the laser diode 51 and generates the feedback control signal for the laser driver 41, and the like.

The laser light is emitted from the laser diode (LD) 51 that is a semiconductor laser.

The laser light passes through a collimator lens 52, a polarizing beam splitter (PBS) 53, and an objective lens 54, and is emitted onto the optical disk 10.

The polarizing beam splitter 53 includes, for example, a separation surface that transmits P polarization light approximately 100% and reflects S polarization light approximately 100%.

The light reflected from the recording layer of the optical disk 10 returns through the same optical path, and is made incident onto the polarizing beam splitter 53.

A $\lambda/4$ element (not illustrated) is interposed, whereby the incident laser light is reflected approximately 100% by the polarizing beam splitter 53.

The laser light reflected by the polarizing beam splitter 53 is concentrated on a light receiving surface of the photodetector 56 through a lens 55.

The photodetector 56 includes, on the light receiving surface, a light receiving cell that photoelectrically converts the incident light.

Figure 2:
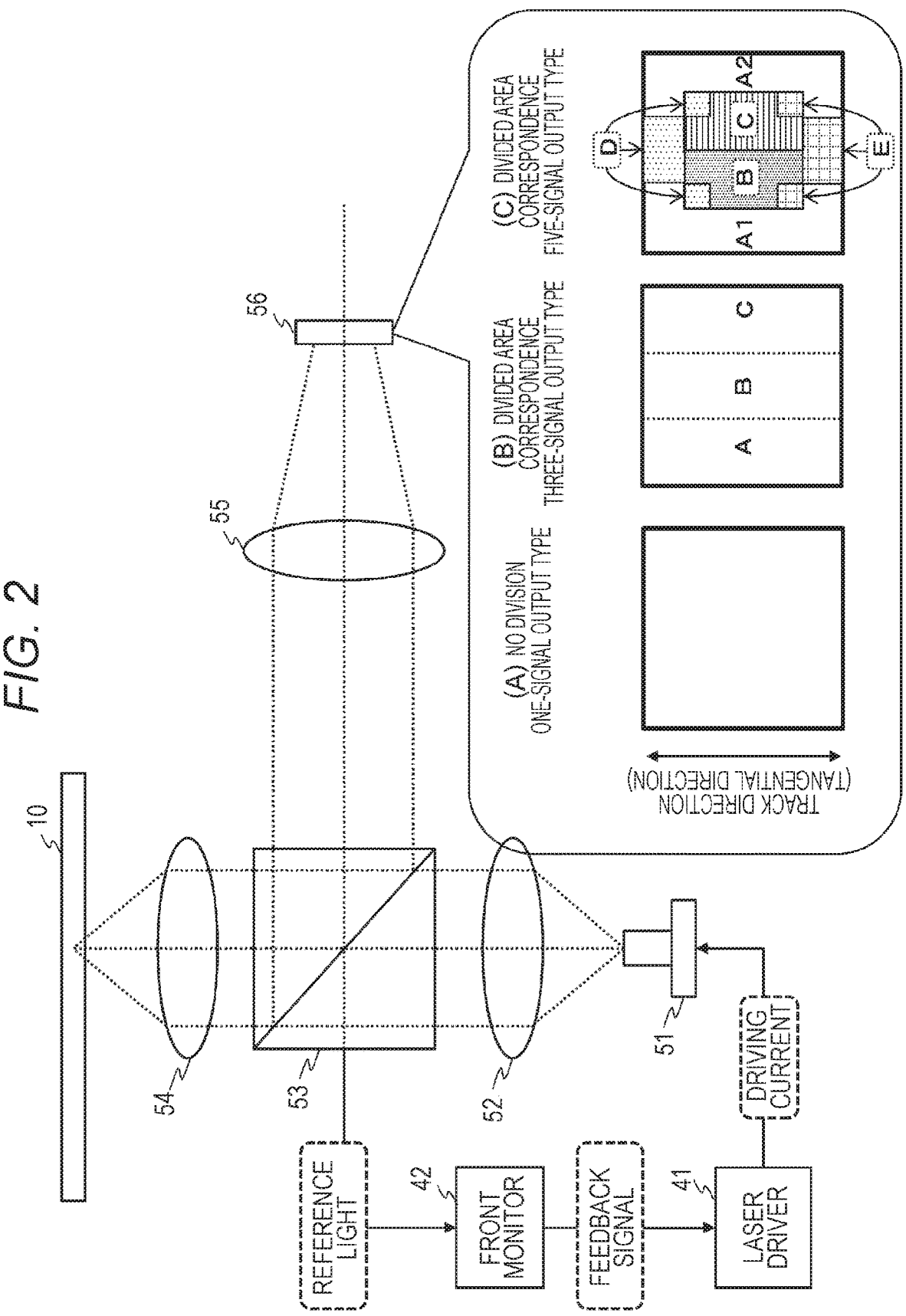
FIG. 2 is a diagram illustrating an exemplary configuration of an optical pickup.

There are various types of photodetector 56 as illustrated in FIG. 2. In FIG. 2, the following three types of examples are illustrated.

(A) No division one-signal output type
(B) Divided area correspondence three-signal output type
(C) Divided area correspondence five-signal output type No division one-signal output type (A) outputs one electric signal corresponding to the amount of light received by the light receiving cell on the entire surface of the photodetector 56.

Divided area correspondence three-signal output type (B) includes light receiving cells into which the light receiving surface of the photodetector 56 is divided, and outputs three electric signals corresponding to the amounts of light received by the light receiving cells in respective divided areas.

Divided area correspondence five-signal output type (C) includes light receiving cells into which the light receiving surface of the photodetector 56 is divided, and outputs five electric signals corresponding to the amounts of light received by the light receiving cells in respective divided area.

The light receiving cell of the divided area correspondence three-signal output type (B) and the divided area correspondence five-signal output type (C) are divided into a plurality of areas by a dividing line extending in the radial direction (disk radial direction) and the tangential direction (track direction) of the optical disk 10.

Those divided type photodetectors 56 output the electric signal of a plurality of channels corresponding to the amount of received light in each area of the light receiving cell.

Note that there may be various division configurations other than those described above.

Figure 3:
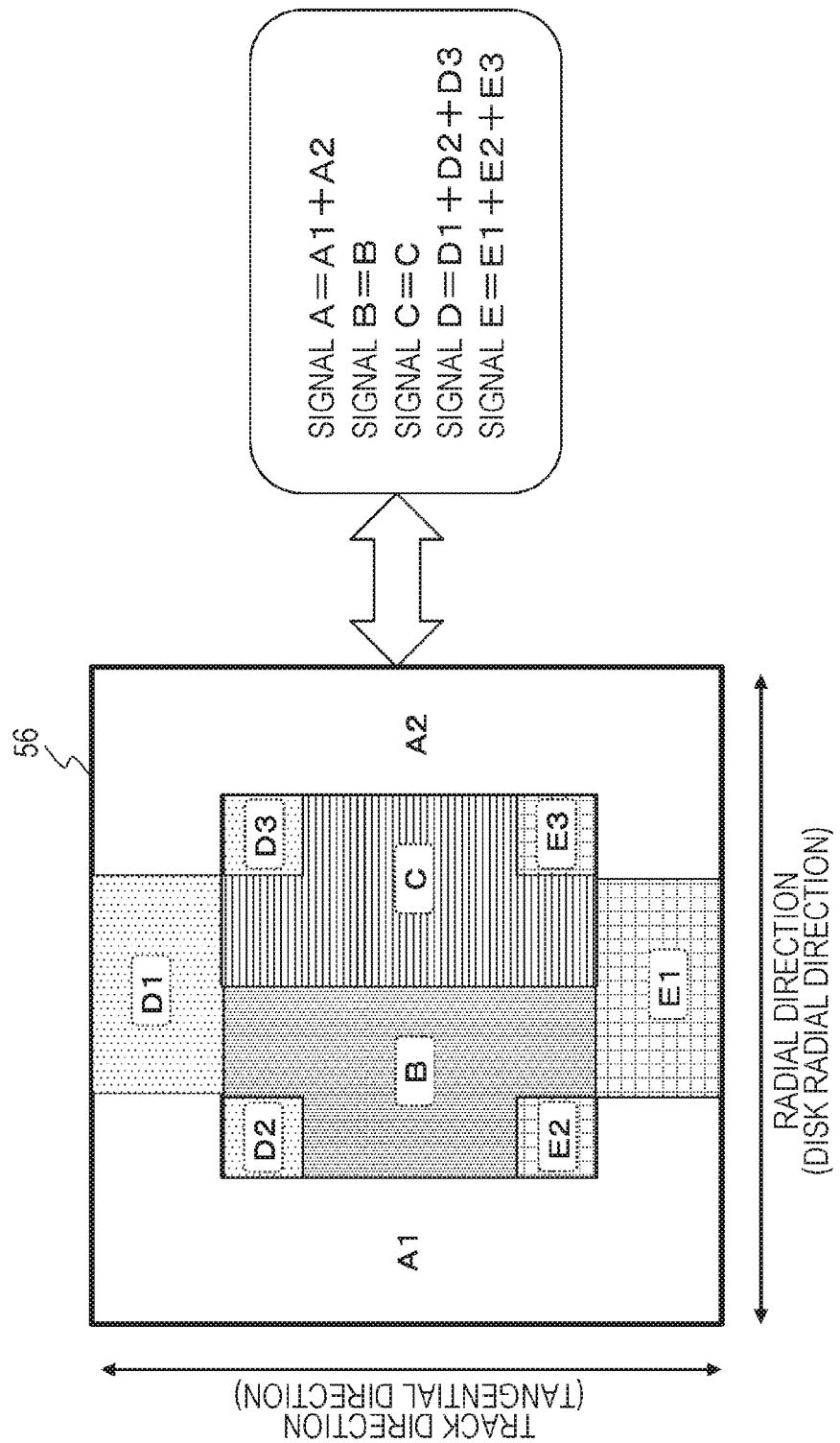
FIG. 3 is a diagram illustrating an exemplary configuration of an optical pickup of a divided area correspondence five-signal output type.

FIG. 3 illustrates a detailed configuration of the photodetector 56 of the divided area correspondence five-signal output type (C) illustrated in FIG. 2.

As illustrated in FIG. 3, the photodetector 56 includes the light receiving cell divided into the plurality of areas.

In the example illustrated in FIG. 3, it is divided into those areas A1, A2, B, C, D1, D2, D3, E1, E2, and E3.

In each divided area, the electric signal corresponding to the amount of received light is individually output.

However, the signal applied to the generation of the reproduction signal is the five signals corresponding to the following five channels.

Signal A=A1+A2
Signal B=B
Signal C=C
Signal D=D1+D2+D3
Signal E=E1+E2+E3

The reproduction signal is generated using those five signals.

Note that the signal including an addition signal of the plurality of areas may be multiplied by a preset weighting coefficient of an area unit to generate the signal.

For example, $A=p*A1+q*A2$

The output signal may be generated by being multiplied by the weighting coefficients p and q mentioned above.

By using such a divided type photodetector, each signal is subject to adaptive equalization processing using a multiple input adaptive equalizer, whereby a high-quality reproduction signal can be obtained.

A configuration of the adaptive equalization processing using the multiple input adaptive equalizer will be described later.

Each of the signals A to E is a characteristic signal corresponding to a light receiving area such as a signal including a large number of signal components of a read target track and a signal having a high ratio of crosstalk signals of an adjacent track. The high-quality reproduction signal can be obtained by executing the adaptive equalization processing corresponding to the characteristics of each of those signals.

Incidentally, a configuration of the reproduction signal generation processing using such a divided type photodetector is disclosed in Patent Document 1 (International Publication No. WO 2016/006157 A1), which is a prior application of the present applicant.

A configuration of the multi-signal output type photodetector used in the present disclosure is similar to those disclosed in the publication document, and a setting of a plurality of signals output from the photodetector and configuration and processing for obtaining an equalization signal and a binary signal by inputting each of the plurality of signals into the multiple input adaptive equalizer are similarly applied in the present disclosure.

Note that the configuration of the optical pickup 11 illustrated in FIG. 2 is the minimum constituent elements for explaining the present disclosure, and the focus error signal and the tracking error signal output to the optical block servo circuit 21 via the matrix circuit 14, a signal for generating the push-pull signal output to the wobble signal processing circuit 16 via the matrix circuit 14, and the like are omitted.

In addition, various configurations other than the configuration illustrated in FIG. 2 are possible.

Note that examples of the present disclosure to be described below will be described mainly as an example using the photodetector of the divided area correspondence five-signal output type described with reference to FIG. 3.

However, processing according to the present disclosure is not limited to the photodetector of the divided area correspondence five-signal output type described with reference to FIG. 3, and can be applied to configurations in which the photodetector having the configuration of the no division one-signal output type or the divided area correspondence three-signal output type illustrated in FIG. 2, or another division configuration is used.

In a case where the divided type photodetector such as the divided area correspondence three-signal output type photodetector, the divided area correspondence five-signal output type photodetector, and the like is used, a light pencil of returning light from the optical disk 10 is divided into a plurality of areas, whereby the reproduction information signals of a plurality of channels corresponding to respective areas can be obtained.

The high-quality reproduction signal can be obtained by data processing using signals of those area units.

Here, as a method of obtaining the reproduction information signal for each area, a method other than the method of dividing the photodetector 56 can be used.

For example, a method in which, in the optical pickup 11 illustrated in FIG. 2, an optical path converting element for separating a plurality of areas is disposed in the optical path passing through the objective lens 54 and reaching the photodetector 56, and a plurality of beams separated by the optical path converting element is supplied to different photodetectors can be used.

A diffraction element such as a holographic optical element, a refraction element such as a microlens array and a microprism, and the like can be used as the optical path converting element.

[1-2. Exemplary Configuration of Data Detection Processing Unit]

Next, an exemplary configuration of the data detection processing unit 15 in the configuration illustrated in FIG. 1 will be described with reference to FIG. 4.

As described above, the optical pickup 11 reproduces the optical disk 10, and detection signals corresponding to respective areas are supplied to the matrix circuit 14 to be made reproduction information signals of the plurality of channels corresponding to the respective areas.

Figure 4:
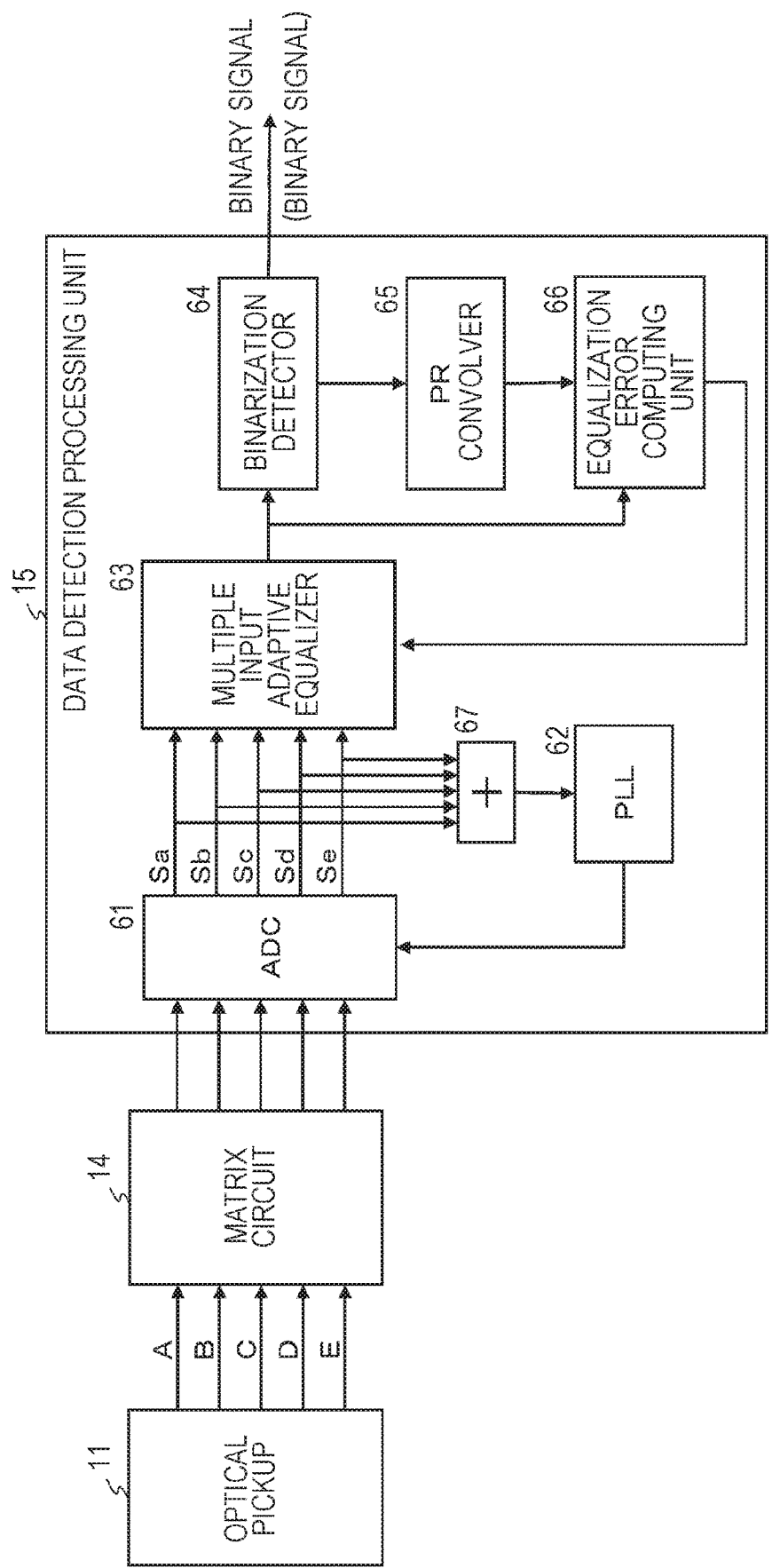
FIG. 4 is a diagram illustrating an exemplary configuration of a data detection processing unit.

As illustrated in FIG. 4, the data detection processing unit 15 includes an A/D converter 61 to which the reproduction information signal is supplied from the matrix circuit 14.

Note that FIG. 4 illustrates an exemplary configuration of the data detection processing unit 15 that generates the reproduction signal by inputting the five signals A to E obtained by using the photodetector 56 of the divided area correspondence five-signal output type illustrated in FIG. 3.

A clock for the A/D converter 61 is formed by a PLL 62.

The reproduction information signal supplied from the matrix circuit 14 is converted into digital data by the A/D converter 61.

The reproduction information signals of the digitized five channels of the signals A to E are denoted by Sa to Se.

A signal obtained by adding the reproduction information signals Sa to Se by an adder circuit 67 is supplied to the PLL 62.

Here, the signals A to E are electric signals corresponding to the amount of received light in the following areas described earlier with reference to FIG. 3.

Signal A=A1+A2
Signal B=B
Signal C=C
Signal D=D1+D2+D3
Signal E=E1+E2+E3

As illustrated in FIG. 4, the data detection processing unit 15 includes a multiple input adaptive equalizer 63, a binarization detector 64, a pertial response (PR) convolver 65, and an equalization error computing unit 66.

The multiple input adaptive equalizer 63 performs PR adaptive equalization processing on the basis of the reproduction information signals Sa to Se.

That is, the reproduction information signals Sa to Se are output through the adaptive equalizer, and is equalized to approximate a PR waveform targeting an added equalization signal y0.

Here, an output of the multiple input adaptive equalizer may be used as a signal to be input to the PLL 62. In this case, an initial coefficient of the multiple input adaptive equalizer is set to a predetermined value.

The binarization detector 64 is, for example, a Viterbi decoder, and performs the maximum likelihood decoding processing on the PR equalized equalization signal y0 to obtain a binarized data DT.

This binarized data DT is supplied to the encoding/decoding unit 17 illustrated in FIG. 1, and subject to reproduction data demodulation processing.

In the Viterbi decoding, a Viterbi detector including a plurality of states constituted with consecutive bits of a predetermined length as a unit and a branch represented by a transition between the states is used, and a desired bit sequence can be efficiently detected from among all possible bit sequences.

In an actual circuit, two registers are prepared. That is, for each state, a register called a path metric register that stores a path metric of a partial response sequence and a signal up to that state, and a register called a path memory register that stores a flow of the bit sequence up to that state.

Further, for each branch, there is prepared a computing unit called a branch metric unit that calculates a path metric of a partial response sequence and a signal in that bit.

In this Viterbi decoder, various bit sequences can be associated with each other by one-to-one relationship using one of paths passing through the states.

Besides, the path metric between the partial response sequence passing through those paths and an actual signal (reproduction signal) can be obtained by the transition between the states constituting the above-described path, that is, by sequentially adding the above-described branch metric in the branch.

Moreover, a selection of a path that minimizes the path matric can be achieved by sequentially selecting a path with a small path metric while comparing the magnitude of the path metrics included in two or less branches to be reached in each state.

By transferring the selection information to the path memory register, information that indicates the path reaching each state in the bit sequence is stored.

Since a value of the path memory register converges to the bit sequence that eventually minimizes the path metric while being sequentially updated, the result is output.

In the PR convolver 65, convolution processing is performed on a binarization result to generate a target signal Zk.

This target signal Zk is, since it is a convolution of the binary detection result, an ideal signal without noise.

For example, in the case of a PR (1, 2, 2, 2, 1), a value P for each channel clock is (1, 2, 2, 2, 1). The constraint length is five.

Further, in the case of a PR (1, 2, 3, 3, 3, 2, 1), the value P for each channel clock is (1, 2, 3, 3, 3, 2, 1). The constraint length is seven.

In a case where a recording density is increased to the extent that a capacity exceeds 35 GB with the wavelength $\lambda$=405 nm with respect to the laser light, the NA=0.85 with respect to the objective lens, and the track pitch made constant to 0.32 μm, detection becomes difficult unless detection capability is increased by extending the constraint length of the partial response from five to seven.

The equalization error computing unit 66 obtains an equalization error ek from the equalization signal y0 from the multiple input adaptive equalizer 63 and the target signal Zk, and supplies the equalization error ek to the multiple input adaptive equalizer 63 for tap coefficient control.

Figure 7:
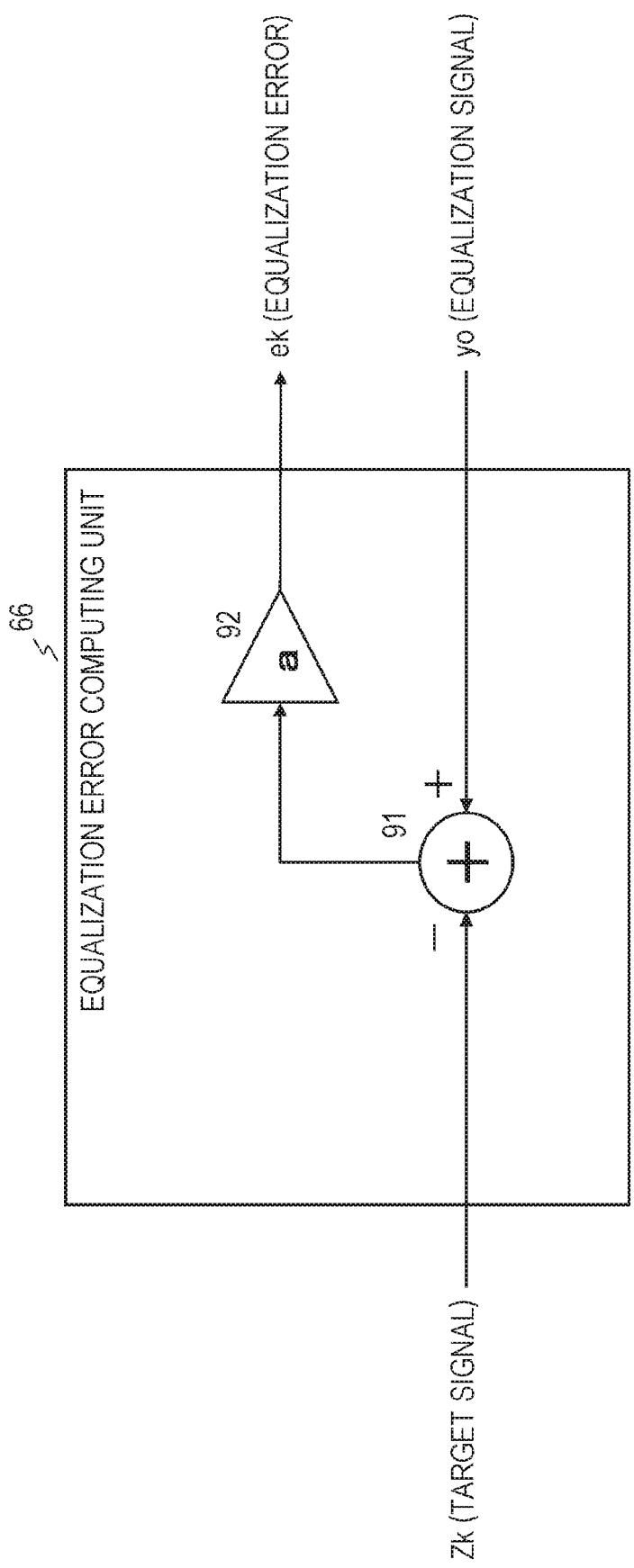
FIG. 7 is a diagram illustrating an exemplary equalization error computing unit.

As illustrated in FIG. 7, the equalization error computing unit 66 includes a subtractor 91 and a coefficient multiplier 92.

The subtractor 81 subtracts the target signal Zk from the equalization signal y0.

The equalization error ek is generated by multiplying the subtraction result by a predetermined coefficient a using the coefficient multiplier 82.

Figure 5:
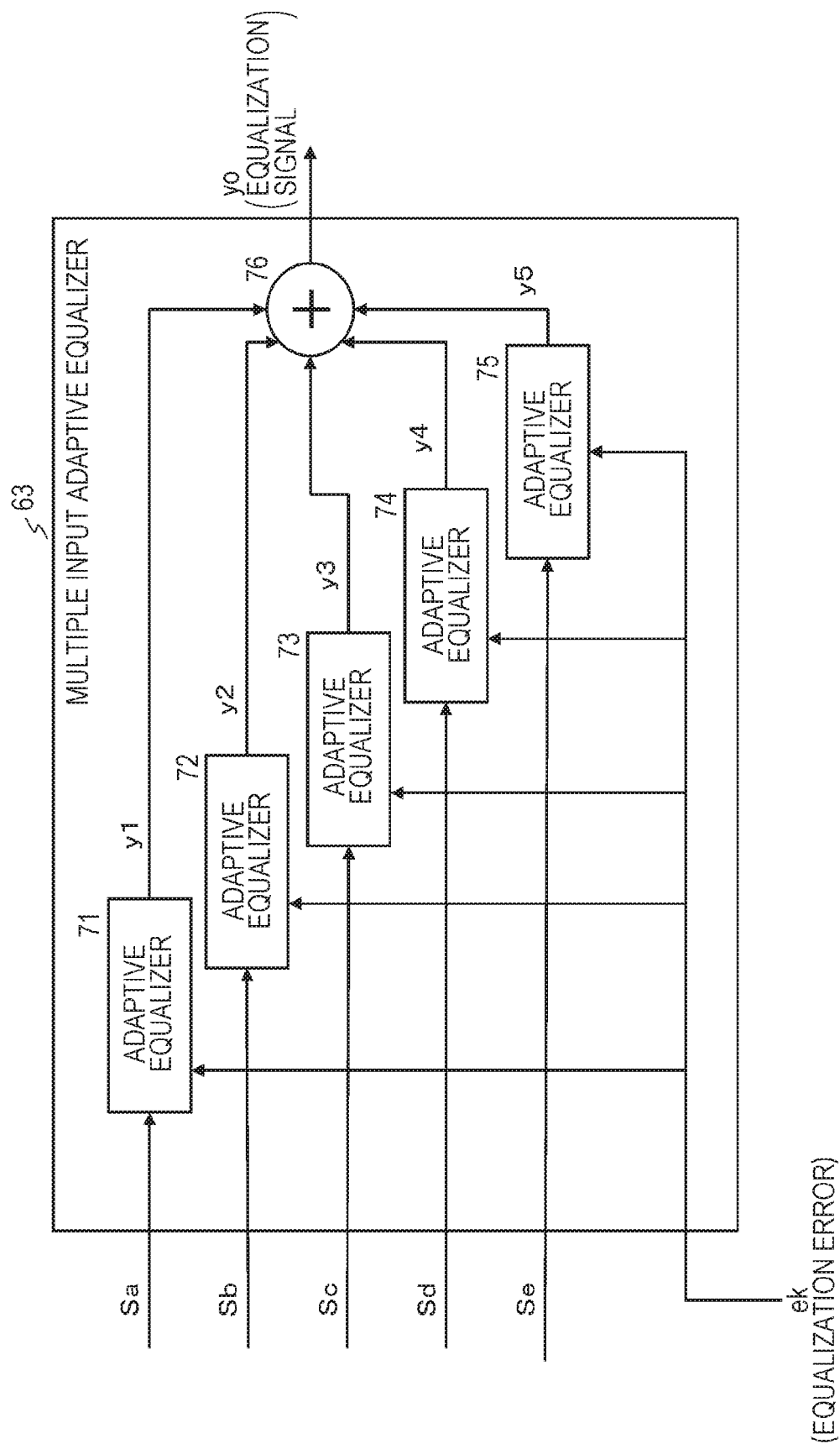
FIG. 5 is a diagram illustrating an exemplary multiple input adaptive equalizer.

As illustrated in FIG. 5, the multiple input adaptive equalizer 63 includes adaptive equalizers 71 to 75, and an adder 76.

The reproduction information signal Sa described above is input to the adaptive equalizer 71, the reproduction information signal Sb is input to the adaptive equalizer 72, the reproduction information signal Sc is input to the adaptive equalizer 73, the reproduction information signal Sd is input to the adaptive equalizer 74, and the reproduction information signal Se is input to the adaptive equalizer 75.

The adaptive equalizer is provided corresponding to the number of divided signals A to E obtained from the divided area.

Each of the adaptive equalizers 71 to 75 includes, for example, a finite impulse response (FIR) filter, and a least means square transversal filter (LMSTVF) provided with a tap coefficient computing unit that executes updating operation processing of the tap coefficient using the least squares method.

Each of the adaptive equalizers 71 to 75 includes a finite impulse response (FIR) filter tap number, calculation accuracy (bit resolution) thereof, and a parameter of an update gain of adaptive operation, and an optimal value is set for each of them.

The equalization error ek is supplied to each of the adaptive equalizers 71 to 75 as a coefficient control value for adaptive control.

Outputs y1 to y5 of the adaptive equalizers 71 to 75 are added by the adder 76 and output as the equalization signal y0 of the multiple input adaptive equalizer 63.

An output target of the multiple input adaptive equalizer 63 is an ideal PR waveform in which the binary detection result is convoluted into the partial response (PR).

Figure 6:
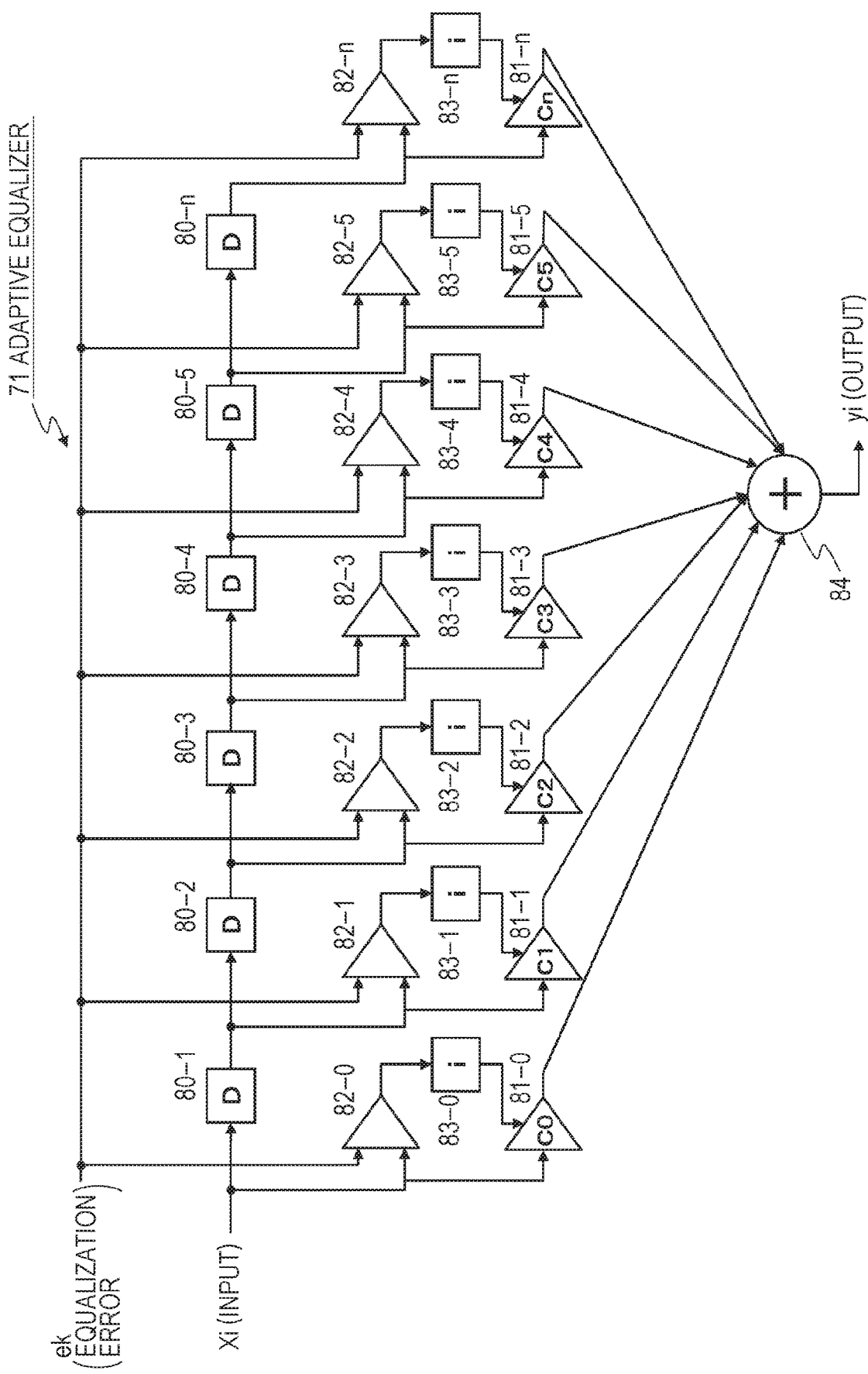
FIG. 6 is a diagram illustrating an exemplary adaptive equalizer.

The adaptive equalizer 71 includes, for example, an FIR filter as illustrated in FIG. 6.

The adaptive equalizer 71 is a filter having an n+1 stage tap including delay elements 80-1 to 80-n, coefficient multipliers 81-0 to 81-n, and an adder 84.

The coefficient multipliers 81-0 to 81-n multiply an input x at each time point by tap coefficients C0 to Cn.

Outputs of the coefficient multipliers 81-0 to 81-n are added by the adder 84 and taken out as an output y.

The tap coefficients C0 to Cn are controlled to perform adaptive equalization processing.

For that purpose, there are provided the equalization error ek and computing units 82-0 to 82-n that perform arithmetic operation by each tap input being input.

In addition, there are provided integrators 83-0 to 83-n that integrate outputs of respective computing units 82-0 to 82-n.

In each of the computing units 82-0 to 82-n, for example, an arithmetic operation of $-1 \times ek \times x$ is performed.

The outputs of the computing units 82-0 to 82-n are integrated by the integrators 83-0 to 83-n, and the tap coefficients C0 to Cn of the coefficient multipliers 81-0 to 81-n are changed and controlled on the basis of the integration result.

Here, the integration of the integrators 83-0 to 83-n is performed in order to adjust responsiveness of adaptive coefficient control.

In the data detection processing unit 15 having the configuration described above, the binarized data is decoded after unnecessary signals such as crosstalk are reduced.

Other adaptive equalizers 72 to 75 illustrated in FIG. 5 also have the configuration similar to that of the adaptive equalizer 71.

The common equalization error ek is supplied to the adaptive equalizers 71 to 75, and adaptive equalization is performed.

That is, in the adaptive equalizers 71 to 75, the error and phase distortion of the input signal frequency components of the reproduction information signals Sa, Sb, Sc, Sd, and Se are optimized, in other words, adaptive PR equalization is performed.

That is, the tap coefficients C0 to Cn are adjusted corresponding to an arithmetic operation result of $-1 \times ek \times x$ in the computing units 82-0 to 82-n.

This indicates that the tap coefficients C0 to Cn are adjusted in the direction in which the equalization error is eliminated.

As described above, in the adaptive equalizers 71 to 75, the tap coefficients C0 to Cn are adaptively controlled in the direction in which a target frequency characteristic is obtained using the equalization error ek.

The equalization signal y0 of the multiple input adaptive equalizer 63, which is obtained by adding the outputs y1, y2, y3, y4, and y5 of the adaptive equalizers 71 to 75 using the adder 76, is a signal in which the crosstalk and the like are reduced.

Note that a specific example of tap coefficient control processing and the like corresponding to each of the signals A to E is disclosed in the above-described Patent Document 1 (International Publication No. WO 2016/006157 A), which is a prior application of the applicant same as the present applicant. In the configuration of the present application as well, tap coefficient setting processing corresponding to each signal similar to that disclosed in the prior application can be applied.

2. CONFIGURATION FOR REDUCING LASER NOISE OF OPTICAL PICKUP INCLUDED IN REPRODUCTION SIGNAL

Next, a configuration for reducing laser noise of the optical pickup included in the reproduction signal will be described.

In a case where data reproduction from the optical disk 10 is executed in the information processing apparatus illustrated in FIG. 1, laser light is emitted from the optical pickup 11, and a reflected light component of the laser light is analyzed.

However, noise included in the laser light itself emitted from the optical pickup 11, which is what is called laser noise, contributes to degradation of quality of the reproduction signal.

Hereinafter, a configuration in which the laser noise included in the reproduction signal is reduced and a high-quality reproduction signal can be generated will be described.

The exemplary configuration of the data detection processing unit 15 in the configuration illustrated in FIG. 1 has been described earlier with reference to FIG. 4.

As described earlier with reference to FIG. 4, the data detection processing unit 15 inputs each signal from the divided type photodetector to the multiple input adaptive equalizer, and performs the adaptive equalization processing, thereby generating a high-quality reproduction signal.

Figure 8:
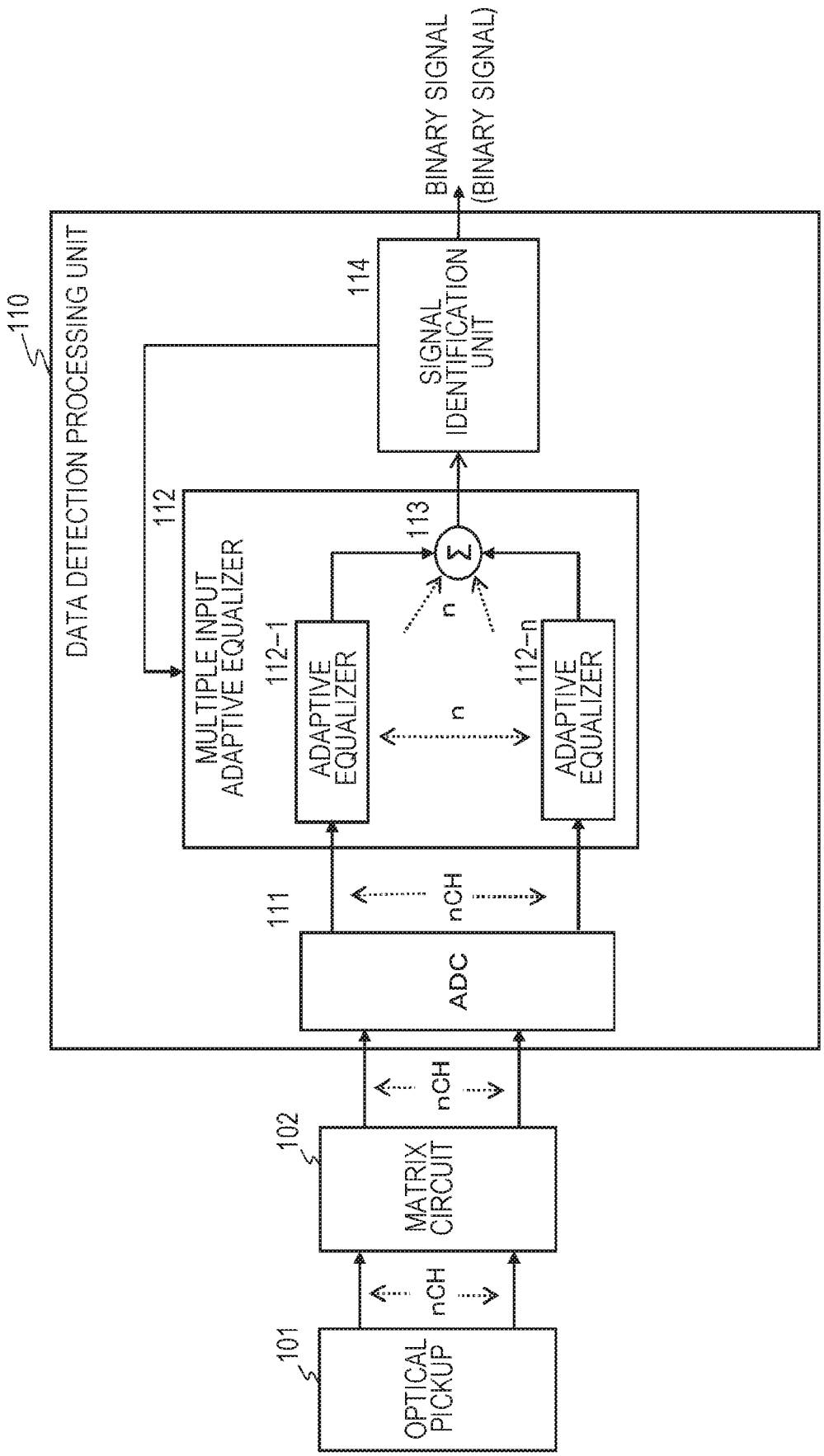
FIG. 8 is a diagram illustrating another exemplary configuration of the data detection processing unit.

FIG. 8 is a diagram illustrating, in a simplified manner, the configuration of the data detection processing unit 15 described earlier with reference to FIG. 4.

As described earlier with reference to FIGS. 2 and 3, the optical pickup 101 is the optical pickup 101 in which the light receiving area is divided into areas. The optical pickup 101 detects the reflected light of the emitted laser light, which is reflected from the optical disk. The detection signals corresponding to the respective divided areas of the optical pickup 101 are supplied to the matrix circuit 102, and the reproduction signals of the plurality of channels (n-channel reproduction signals) corresponding to the respective areas are obtained.

The reproduction signal of the plurality of channels (n-channel reproduction signal) is input to an A/D converter (ADC) 111 of a data detection processing unit 110, converted into a digital signal, and input to a multiple input adaptive equalizer 112.

The multiple input adaptive equalizer 112 includes adaptive equalizers 112-1 to 112-n of the number of n corresponding to respective input signals (n-channel signals), and the respective channel signals are input to the adaptive equalizers 112-1 to 112-n.

The adaptive equalizers 112-1 to 112-n have the FIR configuration described earlier with reference to FIG. 6, and the tap coefficients C0 to Cn are adaptively controlled in the direction in which the target frequency characteristic is obtained using the equalization error ek.

Outputs of the adaptive equalizers 121-1 to 121-n are added by the adder 113, and the equalization signal of the multiple input adaptive equalizer 112, which is the addition signal, is a signal in which the crosstalk and the like are reduced.

A signal identification unit 114 illustrated in FIG. 8 includes the binarization detector 64, the PR convolver 65, and the equalization error computing unit 66 illustrated in FIG. 4.

Note that processing in the data detection processing unit 110 illustrated in FIG. 8 can be executed under the control of a control unit including a CPU that executes a program stored in a storage unit of the information processing apparatus and the like, for example.

An output signal of the data detection processing unit 110 having the configuration illustrated in FIG. 8, that is, a binary signal (binary signal) illustrated in FIG. 8 becomes a signal in which the crosstalk, that is, the noise component from the adjacent track is reduced by the processing of the multiple input adaptive equalizer 112 and the like.

However, although the configuration of the data detection processing unit 110 illustrated in FIG. 8 has the effect of reducing the crosstalk component from the adjacent track, processing for reducing the laser noise included in a laser signal output from the optical pickup 110 is not performed.

Therefore, the output signal of the data detection processing unit 110 having the configuration illustrated in FIG. 8, that is, the binary signal (binary signal) illustrated in FIG. 8 becomes the reproduction signal including the laser noise.

In order to further improve the quality of the reproduction signal, processing for removing or reducing the laser noise component is necessary.

With the configuration of the data detection processing unit 110 illustrated in FIG. 8 being set as a basic configuration, the configuration in which the laser noise component of the optical pickup 101 is removed or reduced from the reproduction signal will be described with reference to FIG. 9 and subsequent drawings.

3. CONFIGURATION AND PROCESSING FOR REDUCING LASER NOISE IN REPRODUCTION SIGNAL

Hereinafter, a plurality of examples in which the laser noise component of the optical pickup 101 is removed or reduced from the reproduction signal of the optical disk will be described.

3-1. (Example 1) Example of Information Processing Apparatus for Reducing Laser Noise in Reproduction Signal First, an example of the information processing apparatus in which the laser noise is reduced from the reproduction signal of the optical disk will be described as Example 1 with reference to FIG. 9.

Figure 9:
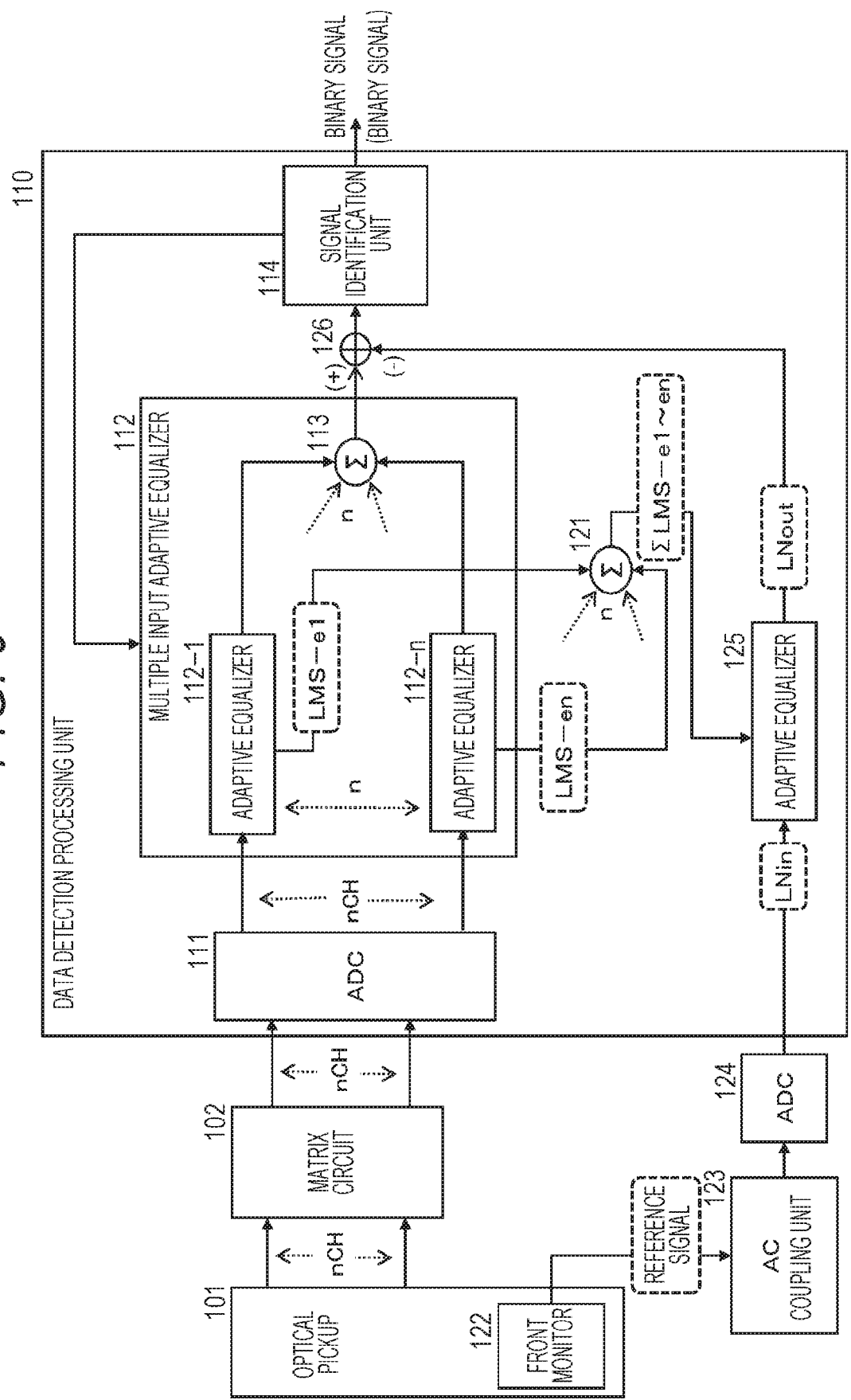
FIG. 9 is a diagram illustrating an exemplary configuration for reducing laser noise included in a reproduction signal.

FIG. 9 is a diagram illustrating an exemplary configuration in which a configuration for reducing the laser noise is added with the configuration in FIG. 8 described above being set as a basic configuration.

In the configuration illustrated in FIG. 9, the optical pickup 101, the matrix circuit 102, the A/D converter (ADC) 111 of the data detection unit 110, the multiple input adaptive equalizer 112, and the signal identification unit 114 have the configurations similar to those illustrated in FIG. 8.

As described earlier with reference to FIGS. 2 and 3, the optical pickup 101 is the optical pickup 101 in which the light receiving area is divided into areas. The optical pickup 101 detects the reflected light of the emitted laser light, which is reflected from the optical disk. The detection signals corresponding to the respective divided areas of the optical pickup 101 are supplied to the matrix circuit 102, and the reproduction signals of the plurality of channels (n-channel reproduction signals) corresponding to the respective areas are obtained.

The reproduction signal of the plurality of channels (n-channel reproduction signal) is input to an A/D converter (ADC) 111 of a data detection processing unit 110, converted into a digital signal, and input to a multiple input adaptive equalizer 112.

The multiple input adaptive equalizer 112 includes adaptive equalizers 112-1 to 112-$n$ of the number of n corresponding to respective input signals (n-channel signals), and the respective channel signals are input to the adaptive equalizers 112-1 to 112-$n$.

Each of the adaptive equalizers 112-1 to 112-$n$ includes, for example, the finite impulse response (FIR) filter, and the least means square transversal filter (LMSTVF) provided with the tap coefficient computing unit that executes the updating operation processing of the tap coefficient using the least squares method.

That is, each of the adaptive equalizers 112-1 to 112-$n$ has the FIR configuration described earlier with reference to FIG. 6, and the tap coefficients C0 to Cn are adaptively controlled in the direction in which the target frequency characteristic is obtained using the equalization error ek.

The outputs of the adaptive equalizers 121-1 to 121-$n$ are added by the adder 113, and the equalization signal of the multiple input adaptive equalizer 112, which is the addition signal, is input to the signal identification unit 114 via a subtractor 126. The equalization signal output from the multiple input adaptive equalizer 112 is a signal in which the crosstalk and the like are reduced.

Note that the signal identification unit 114 illustrated in FIG. 9 includes the binarization detector 64, the PR convolver 65, and the equalization error computing unit 66 illustrated in FIG. 4.

A binary signal for ultimate reproduction signal generation is generated in the signal identification unit 114, and an equalization error signal that is fed back and input to the adaptive equalizer is generated. Those processes will be described later.

In FIG. 9, the following configurations not illustrated in FIG. 8 are included:
a front monitor 122;
an AC coupling unit 123;
an A/D converter (ADC) 124;
an adaptive equalizer 125;
an adder 121; and
a subtractor 126.

Hereinafter, processing in which those configurations are used, that is, processing for reducing the laser noise component of the optical pickup 101 included in the reproduction signal will be described.

Note that the reproduction signal is generated on the basis of the (binary signal) binary signal output from the signal identification unit 114 illustrated in FIG. 9.

The front monitor 122 is provided inside the optical pickup 101, which is a monitoring circuit for the laser light output from the laser diode inside the optical pickup 101. The front monitor 122 obtains the monitoring signal of the laser signal (emitted light) output from the laser diode inside the optical pickup 101, and outputs the reference signal based on the emitted light of the laser diode.

This monitoring signal is the component same as the laser light component with which the optical disk 10 is irradiated, which is the laser light including the noise component.

The front monitor 122 outputs the monitoring laser signal to the AC coupling unit 123.

The AC coupling unit 123 separates, from the monitoring laser signal, the noise component and a DC component other than noise, and extracts a noise signal from which the DC component has been removed.

The noise component signal in the laser light extracted by the AC coupling unit 123 is input to the A/D converter (ADC) 124 of the data detection unit 110, and is converted into a digital signal.

Here, a sampling frequency of the ADC 124 (fs2) that converts the laser noise signal into the digital signal is preferably set to equal to or more than a sampling frequency of the ADC 111 (fs1) of the data detection processing unit 110 that converts the reproduction signal (n-channel reproduction signal) described above into the digital signal. That is, fs2≥fs1.

This setting is for reliably detecting and removing the laser noise signal included in the reproduction signal.

The laser noise signal (LNin) converted into the digital signal is input to the adaptive equalizer 125, and the adaptive equalizer 125 performs the adaptive equalization processing to output the output signal (LNout).

As illustrated in FIG. 9, the input signal to the adaptive equalizer 125 is (LNin), and the output from the adaptive equalizer 125 is (LNout).

The adaptive equalizer 125 has the FIR configuration described earlier with reference to FIG. 6.

As described earlier with reference to FIG. 6, the adaptive equalizer adaptively controls the tap coefficients C0 to Cn in the direction in which the target frequency characteristic is obtained using the equalization error ek, and generates the output signal.

The input LNin to the adaptive equalizer 125 illustrated in FIG. 9 corresponds to an input signal (xi) to the FIR configuration illustrated in FIG. 6.

The output LNout from the adaptive equalizer 125 corresponds to an output signal (yi) from the FIR configuration illustrated in FIG. 6.

Further, the adaptive equalizer 125 illustrated in FIG. 9 inputs the addition signal (ΣLMS-e1 to en) generated in the adder 121 as the equalization error signal (ek) in the configuration illustrated in FIG. 6.

Respective signals of the LMS-e1 to LMS-en correspond to the equalization error signals input to the adaptive equalizers 112-1 to 112-$n$ that execute the adaptive equalization processing on respective signals of the n channels of the optical pickup 101, that is, the equalization error (ek) illustrated in FIG. 6.

In this manner, the addition signal (ΣLMS-e1 to en) of the equalization error signals input to the adaptive equalizers 112-1 to 112-$n$ is input to the adaptive equalizer 125 illustrated in FIG. 9, and the adaptive equalization is performed.

That is, the adaptive equalizer 125 adjusts the tap coefficient in the direction in which the equalization error (ΣLMS-e1 to en) is eliminated to optimize the error and phase distortion of the laser noise signal (LNin) to be input, in other words, to perform the adaptive PR equalization, and generates and outputs the laser noise output (LNout) close to a true noise component in which an error component and the like included in the laser noise signal (LNin) to be input are excluded.

The output signal (LNout) having been subject to the adaptive equalization output from the adaptive equalizer 125 is a signal close to the true noise component in the laser light.

This output signal (LNout) is input to the subtractor 126.

The subtractor 126 executes processing in which the output from the adaptive equalizer 125, that is, the noise signal (LNout) included in the laser light is subtracted from an addition value of adaptive equalization signals that are the outputs from the adaptive equalizers 112-1 to 112-$n$ that execute the adaptive equalization processing on the respective signals of the n channels of the optical pickup 101.

By this subtraction processing, the laser noise component is subtracted from the adaptive equalization signal obtained as the reproduction signal, and the adaptive equalization signal with less noise is input to the signal identification unit 114.

As described earlier, the signal identification unit 114 includes the binarization detector 64, the PR convolver 65, and the equalization error computing unit 66 illustrated in FIG. 4.

The binarization detector 64 is, for example, the Viterbi decoder, and performs the maximum likelihood decoding processing on the PR equalized signal to generate binarized data. Note that this binarized data is supplied to the encoding/decoding unit 17 illustrated in FIG. 1, and subject to the reproduction data demodulation processing.

In the Viterbi decoding, a Viterbi detector including a plurality of states constituted with consecutive bits of a predetermined length as a unit and a branch represented by a transition between the states is used, and a desired bit sequence can be efficiently detected from among all possible bit sequences.

In the PR convolver 65, convolution processing is performed on a binarization result to generate a target signal Zk.

The equalization error computing unit 66 obtains the equalization error ek from the equalization signal y0 from the multiple input adaptive equalizer and the target signal Zk, and supplies the equalization error ek to the multiple input adaptive equalizer 112 illustrated in FIG. 9 for the tap coefficient control.

Here, as described earlier with reference to FIG. 7, the equalization error computing unit 66 includes the subtractor 91 and the coefficient multiplier 92.

The subtractor 81 subtracts the target signal Zk from the equalization signal y0.

The equalization error ek is generated by multiplying the subtraction result by a predetermined coefficient a using the coefficient multiplier 82.

As described above, the configuration of Example 1 illustrated in FIG. 9 includes the adaptive equalizer 125 illustrated in FIG. 9 in order to obtain an accurate value of the laser noise included in the laser light output from the optical pickup 101.

The adaptive equalizer 125 illustrated in FIG. 9 executes the adaptive equalization processing using the equalization error signals input to the adaptive equalizers 112-1 to 112-$n$ that execute the adaptive equalization processing on the respective signals of the n channels of the optical pickup 101.

That is, the adaptive equalizer 125 adjusts the tap coefficient in the direction in which the equalization error (ΣLMS-e1 to en) is eliminated to optimize the error and the phase distortion of the input laser noise signal (LNin), and generates the laser noise output (LNout) close to the true noise component.

The output signal (LNout) having been subject to the adaptive equalization output from the adaptive equalizer 125 is, in the subtractor 126, subtracted from the addition value of the adaptive equalization signals that is the output from the adaptive equalizers 112-1 to 112-*n*.

By this subtraction processing, the laser noise component is subtracted from the adaptive equalization signal obtained as the reproduction signal, and the adaptive equalization signal with less noise is generated.

Further, the equalization error signal in which the laser noise component is reduced is supplied to the adaptive equalizers 112-1 to 112-*n* that execute the adaptive equalization processing on respective signals of the n channels of the optical pickup 101, and the adaptive equalization signal to be eventually obtained and the reproduction signal become a high-quality reproduction signal in which the laser noise component is reduced.

3-2. (Example 2) Example of Information Processing Apparatus for Reducing Laser Noise in Reproduction Signal Next, an example of the information processing apparatus in which the laser noise is reduced from the reproduction signal of the optical disk will be described as Example 2 with reference to FIG. 10.

Figure 10:
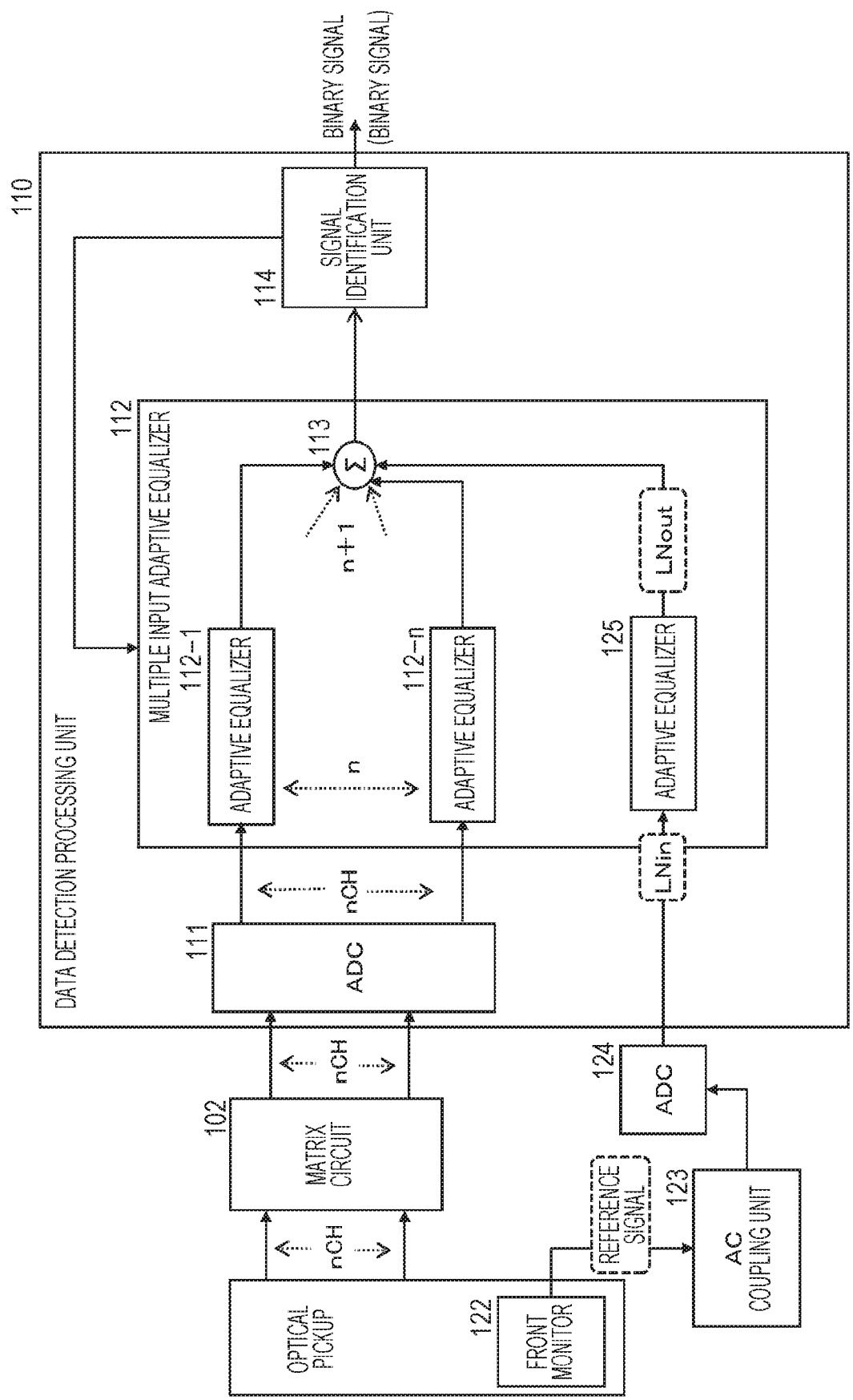
FIG. 10 is a diagram illustrating another exemplary configuration for reducing the laser noise included in the reproduction signal.

A configuration illustrated in FIG. 10 is similar to that in FIG. 9, which is a diagram illustrating an exemplary configuration in which the configuration for reducing the laser noise is added with the configuration in FIG. 8 described earlier being set as a basic configuration.

In the configuration illustrated in FIG. 10, the optical pickup 101, the matrix circuit 102, the A/D converter (ADC) 111 of the data detection unit 110, and the signal identification unit 114 have the configurations similar to those illustrated in FIG. 8.

As described earlier with reference to FIGS. 2 and 3, the optical pickup 101 is the optical pickup 101 in which the light receiving area is divided into areas. The optical pickup 101 detects the reflected light of the emitted laser light, which is reflected from the optical disk. The detection signals corresponding to the respective divided areas of the optical pickup 101 are supplied to the matrix circuit 102, and the reproduction signals of the plurality of channels (n-channel reproduction signals) corresponding to the respective areas are obtained.

The reproduction signal of the plurality of channels (n-channel reproduction signal) is input to an A/D converter (ADC) 111 of a data detection processing unit 110, converted into a digital signal, and input to a multiple input adaptive equalizer 112.

The multiple input adaptive equalizer 112 according to the present Example 2 includes the adaptive equalizers 112-1 to 112-*n* of the number of n to which respective input signals (n-channel signals) are input and the adaptive equalization processing is performed on the respective channel signals, and the adaptive equalizer 125 that performs the adaptive equalization processing on the laser noise, which is similar to that described with reference to FIG. 9.

An input signal (Lnin) to the adaptive equalizer 125 is a signal generated through the front monitor 122, the AC coupling unit 123, and the A/D converter (ADC) 124, which is a signal similar to that described with reference to FIG. 9.

The front monitor 122 is provided inside the optical pickup 101, which is a monitoring circuit for the laser light output from the laser diode inside the optical pickup 101. The front monitor 122 obtains the monitoring signal of the laser signal (emitted light) output from the laser diode inside the optical pickup 101, and outputs the reference signal based on the emitted light of the laser diode.

This monitoring signal is the component same as the laser light component with which the optical disk 10 is irradiated, which is the laser light including the noise component.

The front monitor 122 outputs the monitoring laser signal to the AC coupling unit 123.

The AC coupling unit 123 separates, from the monitoring laser signal, the noise component and a DC component other than noise, and extracts a noise signal from which the DC component has been removed.

The noise component signal in the laser light extracted by the AC coupling unit 123 is input to the A/D converter (ADC) 124 of the data detection unit 110, and is converted into a digital signal.

Here, the sampling frequency of the ADC 124 (fs2) that converts the laser noise signal into the digital signal is preferably set to equal to or more than the sampling frequency of the ADC 111 (fs1) corresponding to the reproduction signal (n-channel reproduction signal). That is, fs2≥fs1.

This setting is for reliably detecting and removing the laser noise signal included in the reproduction signal.

The laser noise signal (LNin) converted into the digital signal is input to the adaptive equalizer 125.

The adaptive equalizer 125 performs the adaptive equalization processing on the input signal (LNin), and outputs the output signal (LNout).

Each of the adaptive equalizers 112-1 to 112-*n*, which executes the adaptive equalization processing on each channel signal corresponding to a read signal of the pickup 101, and the adaptive equalizer 125 that executes the adaptive equalization processing on the laser noise (LNin) include, for example, the finite impulse response (FIR) filter, and the least means square transversal filter (LMSTVF) provided with the tap coefficient computing unit that executes the updating operation processing of the tap coefficient using the least squares method.

The outputs of the adaptive equalizers 121-1 to 121-*n* and the output of the adaptive equalizer 125 are added by the adder 113, and this addition signal is input to the signal identification unit 114.

Note that the signal identification unit 114 illustrated in FIG. 10 includes the binarization detector 64, the PR convolver 65, and the equalization error computing unit 66 illustrated in FIG. 4.

A binary signal for ultimate reproduction signal generation is generated in the signal identification unit 114, and an equalization error signal that is fed back and input to the adaptive equalizer is generated.

The binarization detector 64 is, for example, the Viterbi decoder, and performs the maximum likelihood decoding processing on the PR equalized signal to generate binarized data. Note that this binarized data is supplied to the encoding/decoding unit 17 illustrated in FIG. 1, and subject to the reproduction data demodulation processing.

In the Viterbi decoding, a Viterbi detector including a plurality of states constituted with consecutive bits of a predetermined length as a unit and a branch represented by a transition between the states is used, and a desired bit sequence can be efficiently detected from among all possible bit sequences.

In the PR convolver 65, convolution processing is performed on a binarization result to generate a target signal Zk.

The equalization error computing unit 66 obtains the equalization error ek from the equalization signal y0 from the multiple input adaptive equalizer and the target signal Zk, and supplies the equalization error ek to the multiple input adaptive equalizer 112 illustrated in FIG. 10 for the tap coefficient control.

Here, as described earlier with reference to FIG. 7, the equalization error computing unit 66 includes the subtractor 91 and the coefficient multiplier 92.

The subtractor 81 subtracts the target signal Zk from the equalization signal y0.

The equalization error ek is generated by multiplying the subtraction result by a predetermined coefficient a using the coefficient multiplier 82.

In the configuration illustrated in FIG. 10, the adaptive equalizers 112-1 to 112-$n$, which execute the adaptive equalization processing on the respective channel signals as elements of the reproduction signal, and the adaptive equalizer 125 that performs laser noise adaptive equalization processing are disposed in parallel.

That is, all of the adaptive equalizers 121-1 to 121-$n$ and the adaptive equalizer 125 illustrated in FIG. 10 input the equalization error signal (ek) generated by the equalization error computing unit (see FIG. 7) set inside the signal identification unit 114, and execute the adaptive equalization processing.

Each of the adaptive equalizers 112-1 to 112-$n$ and 125 includes, for example, the FIR filter illustrated in FIG. 6 described earlier.

That is, each of the adaptive equalizers 112-1 to 112-$n$ and 125 is, as illustrated in FIG. 6, the filter having the n+1 stage tap including the delay elements 80-1 to 80-$n$, the coefficient multipliers 81-0 to 81-$n$, and the adder 84.

The coefficient multipliers 81-0 to 81-$n$ multiply the input x at each time point by the tap coefficients C0 to Cn.

The outputs of the coefficient multipliers 81-0 to 81-$n$ are added by the adder 84 to be the output y.

The tap coefficients C0 to Cn are controlled to perform the adaptive equalization processing. For that purpose, there are provided the equalization error ek and computing units 82-0 to 82-$n$ that perform arithmetic operation by each tap input being input. In addition, there are provided integrators 83-0 to 83-$n$ that integrate outputs of respective computing units 82-0 to 82-$n$.

In each of the computing units 82-0 to 82-$n$, for example, the arithmetic operation of $-1 \times ek \times x$ is performed. The outputs of the computing units 82-0 to 82-$n$ are integrated by the integrators 83-0 to 83-$n$, and the tap coefficients C0 to Cn of the coefficient multipliers 81-0 to 81-$n$ are changed and controlled on the basis of the integration result. Here, the integration of the integrators 83-0 to 83-$n$ is performed in order to adjust the responsiveness of the adaptive coefficient control.

Using the configuration described above, the binarized data is decoded after the processing for cancelling the crosstalk and reducing the laser noise is performed.

Each of the adaptive equalizers 112-1 to 112-$n$ and 125 has the configuration illustrated in FIG. 6, and the same equalization error ek is supplied to perform the adaptive equalization.

First, in the adaptive equalizers 112-1 to 112-$n$ to which the channel signals corresponding to the reproduction signals are input, the error and phase distortion of an input signal frequency component of a reproduction channel signal is optimized, in other words, the adaptive PR equalization is performed. This is the same as the function of a normal adaptive equalizer.

That is, the tap coefficients C0 to Cn are adjusted corresponding to the arithmetic operation result of $-1 \times ek \times x$ in each of the computing units 82-0 to 82-$n$ illustrated in FIG. 6, and the tap coefficients C0 to Cn are adjusted in the direction in which the equalization error is eliminated.

Meanwhile, in the adaptive equalizer 125 to which the laser noise (LNin) is input, an output target is uncorrelated with the reproduction signal. Accordingly, in the adaptive equalizer 125, arithmetic operation is performed in such a manner that a correlation component, that is, the laser noise component is canceled.

That is, in the case of the adaptive equalizer 125, the tap coefficients C0 to Cn are adjusted corresponding to the arithmetic operation result of $-1 \times ek \times x$ in each of the computing units 82-0 to 82-$n$, and the tap coefficients C0 to Cn are adjusted such that the frequency characteristic in the direction in which the noise component is eliminated in the addition result of the adder 113 in FIG. 10 can be obtained.

In this manner, in the adaptive equalizers 112-1 to 112-$n$, the tap coefficients C0 to Cn are adaptively controlled in the direction in which the target frequency characteristic is obtained using the equalization error ek, whereas in the adaptive equalizer 125, the tap coefficients C0 to Cn are automatically controlled in the direction in which the frequency characteristic effective for reducing the laser noise is obtained also using the equalization error ek. As a result, the equalization signal y0 of the multiple input adaptive equalizer 112, which is obtained by adding the outputs of the respective adaptive equalizers 112-1 to 112-$n$ and 125 using the adder 113, becomes a signal in which the laser noise is reduced.

As described above, according to the present Example 2, that is, the configuration illustrated in FIG. 10, the multiple input adaptive equalizer 112 includes the adaptive equalizers corresponding to the respective channels of the reproduction signal and the adaptive equalizer corresponding to the laser noise that are disposed in parallel.

When the equalization error signal (ek) is input to those adaptive equalizers, the adaptive equalizer corresponding to the reproduction signal adaptively controls the tap coefficients C0 to Cn in the direction in which the target frequency characteristic is obtained, and the adaptive equalizer 125 corresponding to the laser noise controls the tap coefficients C0 to Cn in the direction in which the frequency characteristic for reducing the laser noise is obtained.

A high-quality reproduction signal in which the laser noise is reduced can be generated by performing the adaptive equalization processing as described above.

3-3. (Example 3) Example of Information Processing Apparatus Having 2T Sampling Configuration for Reducing Laser Noise in Reproduction Signal Next, an example of the information processing apparatus having a 2T sampling configuration for reducing the laser noise in the reproduction signal will be described as Example 3.

Figure 11:
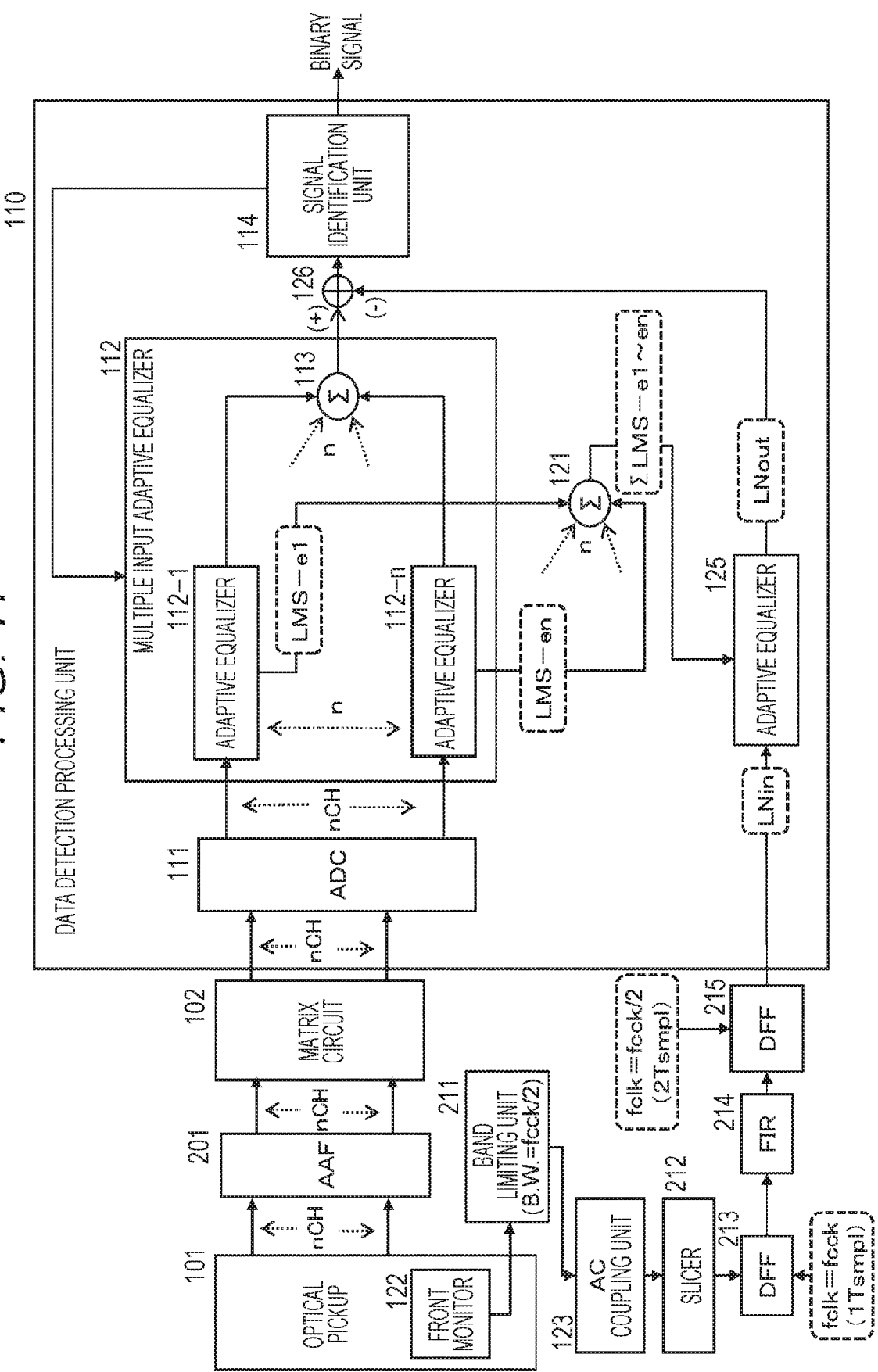
FIG. 11 is a diagram illustrating another exemplary configuration for reducing the laser noise included in the reproduction signal.

FIG. 11 is a diagram illustrating a configuration of the present example.

The configuration illustrated in FIG. 11 is a diagram in which the configuration illustrated in FIG. 9 described earlier as Example 1 is changed to a configuration for performing a 2T sampling.

As described earlier with reference to FIG. 1, in a high-density optical disk, recording is performed at a density corresponding to a channel bit length depending on a disk type.

For example, depending on the disk type, recording is performed at the density corresponding to the channel bit length such as 0.0745 μm/channel bit in the case of a BD of 25 GB/layer, 0.05826 μm/channel bit in the case of a BDXL (registered trademark) of 32 GB/layer, and 0.05587 μm/channel bit in the case of a BDXL (registered trademark) of 33.4 GB/layer. Assuming that a channel clock period is "T", the mark length is 2T to 8T.

That is, reproduction processing is performed by reading recording data having a mark length of 2T or more recorded on the optical disk 10. Such reproduction processing is referred to as a 2T sampling.

FIG. 11 is a diagram illustrating a detailed configuration of a case where the configuration illustrated in FIG. 9 described earlier as Example 1 is changed to the configuration for performing the 2T sampling.

In the configuration illustrated in FIG. 11, new configurations not illustrated in FIG. 9 are the following configurations:
    an anti-aliasing filter (AAF) 201;
    a band limiting unit (B.W.=fcck/2) 211;
    a slicer 212;
    a digital flip flop (DFF) 213;
    an FIR filter 214; and
    a digital flip flop (DFF) 215.

All of those configurations are additional configurations for controlling the input signal to the adaptive equalizer to a signal corresponding to the reproduction data having the mark length of 2T or more.

For example, the anti-aliasing filter (AAF) 201 is a filter for limiting the input signal to the adaptive equalizers 112-1 to 112-n to the reproduction signal having the mark length of 2T or more.

Further, the configurations of the band limiting unit (B.W.=fcck/2) 211 to the digital flip flop (DFF) 215 are the configurations for executing processing for limiting the laser noise signal (LNin) input to the adaptive filter 125 to the laser noise signal that affects the reproduction signal having the mark length of 2T or more.

As described earlier with reference to FIGS. 2 and 3, the optical pickup 101 is the optical pickup 101 in which the light receiving area is divided into areas. The optical pickup 101 detects the reflected light of the emitted laser light, which is reflected from the optical disk.

The detection signals corresponding to the respective divided areas of the optical pickup 101 are input to the anti-aliasing filter (AAF) 201. The anti-aliasing filter (AAF) 201 functions as a noise removal filter that removes a signal having the mark length of 2T or less as noise.

An output of the anti-aliasing filter (AAF) 201 is a reproduction signal having the mark length of 2T or more, in other words, a 2T sampling reproduction signal.

The 2T sampling reproduction signal is supplied to the matrix circuit 102, and the reproduction signals of the plurality of channels (n-channel reproduction signals) corresponding to the respective areas are obtained.

The reproduction signal of the plurality of channels (n-channel reproduction signal) generated by the matrix circuit 102 is input to the A/D converter (ADC) 111 of the data detection processing unit 110, converted into the digital signal, and input to the multiple input adaptive equalizer 112.

The multiple input adaptive equalizer 112 includes adaptive equalizers 112-1 to 112-n of the number of n corresponding to respective input signals (n-channel signals), and the respective channel signals are input to the adaptive equalizers 112-1 to 112-n.

Each of the adaptive equalizers 112-1 to 112-n includes, for example, the finite impulse response (FIR) filter, and the least means square transversal filter (LMSTVF) provided with the tap coefficient computing unit that executes the updating operation processing of the tap coefficient using the least squares method.

That is, each of the adaptive equalizers 112-1 to 112-n has the FIR configuration described earlier with reference to FIG. 6, and the tap coefficients C0 to Cn are adaptively controlled in the direction in which the target frequency characteristic is obtained using the equalization error ek.

The outputs of the adaptive equalizers 121-1 to 121-n are added by the adder 113, and the equalization signal of the multiple input adaptive equalizer 112, which is the addition signal, is input to the signal identification unit 114 via a subtractor 126. The equalization signal output from the multiple input adaptive equalizer 112 is a signal in which the crosstalk and the like are reduced.

Note that the signal identification unit 114 illustrated in FIG. 11 includes the binarization detector 64, the PR convolver 65, and the equalization error computing unit 66 illustrated in FIG. 4.

A binary signal for ultimate reproduction signal generation is generated in the signal identification unit 114, and an equalization error signal that is fed back and input to the adaptive equalizer is generated. Those processes will be described later.

The front monitor 122 is provided inside the optical pickup 101, which is a monitoring circuit for the laser light output from the laser diode inside the optical pickup 101. The front monitor 122 obtains the monitoring signal of the laser signal (emitted light) output from the laser diode inside the optical pickup 101, and outputs the reference signal based on the emitted light of the laser diode.

This monitoring signal is the component same as the laser light component with which the optical disk 10 is irradiated, which is the laser light including the noise component.

The front monitor 122 inputs this monitoring laser signal to the band limiting unit (B.W.=fcck/2) 211.

The band limiting unit (B.W.=fcck/2) 211 executes band limiting processing according to a frequency band in which a channel clock frequency (fcck) is halved.

This is processing for removing the laser light component corresponding to a frequency higher than the band to be reproduced in the 2T sampling reproduction processing.

Subsequently, a band-limited laser light signal generated by the band limiting unit (B.W.=fcck/2) 211 is input to the AC coupling unit 123.

The AC coupling unit 123 separates the noise component and the DC component other than the noise, and extracts the noise signal from which the DC component has been removed.

The noise component signal in the laser light extracted by the AC coupling unit 123 is input to the slicer 212. The slicer 212 generates a binary signal to which a prescribed threshold value is applied. In other words, processing for generating the digital signal is performed.

The laser noise binary signal generated by the slicer 212 is input to the adaptive equalizer 125 through the digital flip flop (DFF) 213, the FIR filter 214, and the digital flip flop (DFF) 215.

The digital flip flop (DFF) 213 executes sampling processing based on a 1T sampling of the laser noise binary signal generated by the slicer 212.

The FIR filter 214 performs filtering processing on the 1T sampling signal generated by the DFF 213, and performs smoothing processing on sampling data. For example, the smoothing processing based on finite impulse response filtering processing in which the number of filters (1, 2, 1) is set is executed.

Further, the 1T sampling smoothed laser noise signal generated by the FIR filter 214 is input to the digital flip flop (DFF) 215.

The digital flip flop (DFF) 215 executes 2T sampling processing on the 1T sampling smoothed laser noise signal generated by the FIR filter 214.

That is, with those configurations, a 2T sampling laser noise signal (LNin) corresponding to the 2T sampling reproduction signal is generated and input to the adaptive equalizer 125.

The adaptive equalizer 125 performs the adaptive equalization processing, and outputs the output signal (LNout).

The adaptive equalizer 125 has the FIR configuration described earlier with reference to FIG. 6.

As described earlier with reference to FIG. 6, the adaptive equalizer adaptively controls the tap coefficients C0 to Cn in the direction in which the target frequency characteristic is obtained using the equalization error ek, and generates the output signal.

The input LNin to the adaptive equalizer 125 illustrated in FIG. 11 corresponds to the input signal (xi) to the FIR configuration illustrated in FIG. 6.

The output LNout from the adaptive equalizer 125 corresponds to an output signal (yi) from the FIR configuration illustrated in FIG. 6.

Further, the adaptive equalizer 125 illustrated in FIG. 11 inputs the addition signal (ΣLMS-e1 to en) generated in the adder 121 as the equalization error signal (ek) in the configuration illustrated in FIG. 6.

Respective signals of the LMS-e1 to LMS-en correspond to the equalization error signals input to the adaptive equalizers 112-1 to 112-n that execute the adaptive equalization processing on respective signals of the n channels of the optical pickup 101, that is, the equalization error (ek) illustrated in FIG. 6.

In this manner, the addition signal (ΣLMS-e1 to en) of the equalization error signals input to the adaptive equalizers 112-1 to 112-n is input to the adaptive equalizer 125 illustrated in FIG. 11, and the adaptive equalization is performed.

That is, the adaptive equalizer 125 adjusts the tap coefficient in the direction in which the equalization error (ΣLMS-e1 to en) is eliminated to optimize the error and phase distortion of the laser noise signal (LNin) to be input, in other words, to perform the adaptive PR equalization, and generates and outputs the laser noise output (LNout) close to a true noise component in which an error component and the like included in the laser noise signal (LNin) to be input are excluded.

The output signal (LNout) having been subject to the adaptive equalization output from the adaptive equalizer 125 is a signal close to the true noise component in the laser light.

This output signal (LNout) is input to the subtractor 126.

The subtractor 126 executes processing in which the output from the adaptive equalizer 125, that is, the noise signal (LNout) included in the laser light is subtracted from an addition value of adaptive equalization signals that are the outputs from the adaptive equalizers 112-1 to 112-n that execute the adaptive equalization processing on the respective signals of the n channels of the optical pickup 101.

By this subtraction processing, the laser noise component is subtracted from the adaptive equalization signal obtained as the reproduction signal, and the adaptive equalization signal with less noise is input to the signal identification unit 114.

As described earlier, the signal identification unit 114 includes the binarization detector 64, the PR convolver 65, and the equalization error computing unit 66 illustrated in FIG. 4.

The binarization detector 64 is, for example, the Viterbi decoder, and performs the maximum likelihood decoding processing on the PR equalized signal to generate binarized data. Note that this binarized data is supplied to the encoding/decoding unit 17 illustrated in FIG. 1, and subject to the reproduction data demodulation processing.

In the Viterbi decoding, a Viterbi detector including a plurality of states constituted with consecutive bits of a predetermined length as a unit and a branch represented by a transition between the states is used, and a desired bit sequence can be efficiently detected from among all possible bit sequences.

In the PR convolver 65, convolution processing is performed on a binarization result to generate a target signal Zk.

The equalization error computing unit 66 obtains the equalization error ek from the equalization signal y0 from the multiple input adaptive equalizer and the target signal Zk, and supplies the equalization error ek to the multiple input adaptive equalizer 112 illustrated in FIG. 11 for the tap coefficient control.

Here, as described earlier with reference to FIG. 7, the equalization error computing unit 66 includes the subtractor 91 and the coefficient multiplier 92.

The subtractor 81 subtracts the target signal Zk from the equalization signal y0.

The equalization error ek is generated by multiplying the subtraction result by a predetermined coefficient a using the coefficient multiplier 82.

As described above, the configuration of Example 3 illustrated in FIG. 11 includes, in the configuration for executing the 2T sampling reproduction processing, the adaptive equalizer 125 illustrated in FIG. 11 in order to obtain an accurate value of the laser noise included in the laser light output from the optical pickup 101.

The adaptive equalizer 125 illustrated in FIG. 11 executes the adaptive equalization processing using the equalization error signals input to the adaptive equalizers 112-1 to 112-n that execute the adaptive equalization processing on the respective signals of the n channels of the optical pickup 101.

That is, the adaptive equalizer 125 adjusts the tap coefficient in the direction in which the equalization error (ΣLMS-e1 to en) is eliminated to optimize the error and the phase distortion of the input laser noise signal (LNin), and generates the laser noise output (LNout) close to the true noise component.

The output signal (LNout) having been subject to the adaptive equalization output from the adaptive equalizer 125 is, in the subtractor 126, subtracted from the addition value of the adaptive equalization signals that is the output from the adaptive equalizers 112-1 to 112-n.

By this subtraction processing, the laser noise component is subtracted from the adaptive equalization signal obtained as the reproduction signal, and the adaptive equalization signal with less noise is generated.

As a result of this processing, the equalization error signal in which the laser noise component is reduced is supplied to the adaptive equalizers 112-1 to 112-n that execute the adaptive equalization processing on the respective signals of the n channels of the optical pickup 101, and the adaptive equalization signal to be eventually obtained and the reproduction signal become a high-quality reproduction signal in which the laser noise component is reduced.

3-4. (Example 4) Example of Information Processing Apparatus Having 2T Sampling Configuration for Reducing Laser Noise in Reproduction Signal Next, another example of the information processing apparatus having a 2T sampling configuration in which the laser noise is reduced from the reproduction signal of the optical disk will be described as Example 4 with reference to FIG. 12.

Figure 12:
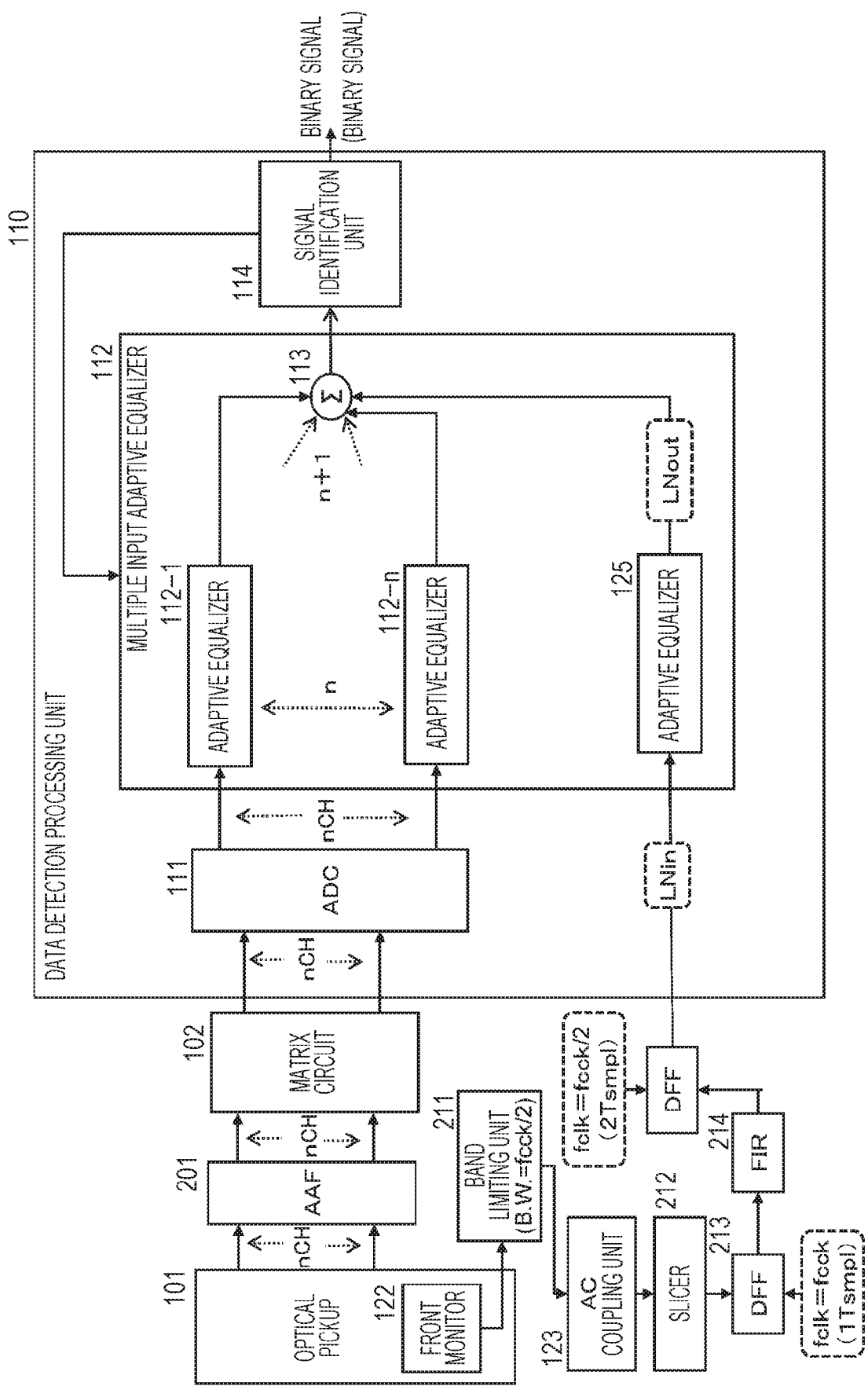
FIG. 12 is a diagram illustrating another exemplary configuration for reducing the laser noise included in the reproduction signal.

FIG. 12 is a diagram illustrating a configuration of the present example.

The configuration illustrated in FIG. 12 is a diagram in which the configuration illustrated in FIG. 10 described earlier as Example 2 is changed to a configuration for performing the 2T sampling.

In the configuration illustrated in FIG. 12, new configurations not illustrated in FIG. 10 are the following configurations:
an anti-aliasing filter (AAF) 201;
a band limiting unit (B.W.=fcck/2) 211;
a slicer 212;
a digital flip flop (DFF) 213;
an FIR filter 214; and
a digital flip flop (DFF) 215.

Each of those configurations is a processing configuration for making the input signal to the adaptive equalizer a signal corresponding to the 2T sampling.

That is, the anti-aliasing filter (AAF) 201 is the filter for limiting the input signal to the adaptive equalizers 112-1 to 112-n to the reproduction signal having the mark length of 2T or more.

Further, the configurations of the band limiting unit (B.W.=fcck/2) 211 to the digital flip flop (DFF) 215 are the configurations for executing processing for limiting the laser noise signal (LNin) input to the adaptive filter 125 to the laser noise signal that affects the reproduction signal having the mark length of 2T or more.

As described earlier with reference to FIGS. 2 and 3, the optical pickup 101 is the optical pickup 101 in which the light receiving area is divided into areas. The optical pickup 101 detects the reflected light of the emitted laser light, which is reflected from the optical disk.

The detection signals corresponding to the respective divided areas of the optical pickup 101 are input to the anti-aliasing filter (AAF) 201. The anti-aliasing filter (AAF) 201 functions as a noise removal filter that removes a signal having the mark length of 2T or less as noise.

An output of the anti-aliasing filter (AAF) 201 is a reproduction signal having the mark length of 2T or more, in other words, a 2T sampling reproduction signal.

The 2T sampling reproduction signal is supplied to the matrix circuit 102, and the reproduction signals of the plurality of channels (n-channel reproduction signals) corresponding to the respective areas are obtained.

The reproduction signal of the plurality of channels (n-channel reproduction signal) generated by the matrix circuit 102 is input to the A/D converter (ADC) 111 of the data detection processing unit 110, converted into the digital signal, and input to the multiple input adaptive equalizer 112.

The multiple input adaptive equalizer 112 includes adaptive equalizers 112-1 to 112-n of the number of n corresponding to respective input signals (n-channel signals), and the respective channel signals are input to the adaptive equalizers 112-1 to 112-n.

The multiple input adaptive equalizer 112 according to the present Example 4 includes, similarly to that according to Example 2 described earlier with reference to FIG. 10, the adaptive equalizers 112-1 to 112-n of the number of n to which the respective input signals (n-channel signals) are input and the adaptive equalization processing is performed on the respective channel signals, and the adaptive equalizer 125 that performs the adaptive equalization processing on the laser noise, which is similar to that described with reference to FIG. 9.

The input signal (Lnin) to the adaptive equalizer 125 is a signal generated through the front monitor 122, the band limiting unit (B.W.=fcck/2) 211, the AC coupling unit 123, the slicer 212, the digital flip flop (DFF) 213, the FIR filter 214, and the digital flip flop (DFF) 215, which is a signal similar to that described with reference to FIG. 11.

The front monitor 122 is provided inside the optical pickup 101, which is a monitoring circuit for the laser light output from the laser diode inside the optical pickup 101. The front monitor 122 obtains the monitoring signal of the laser signal (emitted light) output from the laser diode inside the optical pickup 101, and outputs the reference signal based on the emitted light of the laser diode.

This monitoring signal is the component same as the laser light component with which the optical disk 10 is irradiated, which is the laser light including the noise component.

The front monitor 122 inputs this monitoring laser signal to the band limiting unit (B.W.=fcck/2) 211.

The band limiting unit (B.W.=fcck/2) 211 executes band limiting processing according to a frequency band in which a channel clock frequency (fcck) is halved.

This is processing for removing the laser light component corresponding to a frequency higher than the band to be reproduced in the 2T sampling reproduction processing.

Subsequently, a band-limited laser light signal generated by the band limiting unit (B.W.=fcck/2) 211 is input to the AC coupling unit 123.

The AC coupling unit 123 separates the noise component and the DC component other than the noise, and extracts the noise signal from which the DC component has been removed.

The noise component signal in the laser light extracted by the AC coupling unit 123 is input to the slicer 212. The slicer 212 generates a binary signal to which a prescribed threshold value is applied. In other words, processing for generating the digital signal is performed.

The laser noise binary signal generated by the slicer 212 is input to the adaptive equalizer 125 through the digital flip flop (DFF) 213, the FIR filter 214, and the digital flip flop (DFF) 215.

The digital flip flop (DFF) 213 executes sampling processing based on a 1T sampling of the laser noise binary signal generated by the slicer 212.

The FIR filter 214 performs filtering processing on the 1T sampling signal generated by the DFF 213, and performs smoothing processing on sampling data. For example, the smoothing processing based on finite impulse response filtering processing in which the number of filters (1, 2, 1) is set is executed.

Further, the 1T sampling smoothed laser noise signal generated by the FIR filter 214 is input to the digital flip flop (DFF) 215.

The digital flip flop (DFF) 215 executes 2T sampling processing on the 1T sampling smoothed laser noise signal generated by the FIR filter 214.

That is, with those configurations, a 2T sampling laser noise signal (LNin) corresponding to the 2T sampling reproduction signal is generated and input to the adaptive equalizer 125.

The adaptive equalizer 125 performs the adaptive equalization processing on the input signal (LNin), and outputs the output signal (LNout).

Each of the adaptive equalizers 112-1 to 112-n, which executes the adaptive equalization processing on each channel signal corresponding to a read signal of the pickup 101, and the adaptive equalizer 125 that executes the adaptive equalization processing on the laser noise (LNin) include, for example, the finite impulse response (FIR) filter, and the least means square transversal filter (LMSTVF) provided with the tap coefficient computing unit that executes the updating operation processing of the tap coefficient using the least squares method.

The outputs of the adaptive equalizers 121-1 to 121-n and the output of the adaptive equalizer 125 are added by the adder 113, and this addition signal is input to the signal identification unit 114.

Note that the signal identification unit 114 illustrated in FIG. 12 includes the binarization detector 64, the PR convolver 65, and the equalization error computing unit 66 illustrated in FIG. 4.

A binary signal for ultimate reproduction signal generation is generated in the signal identification unit 114, and an equalization error signal that is fed back and input to the adaptive equalizer is generated.

The binarization detector 64 is, for example, the Viterbi decoder, and performs the maximum likelihood decoding processing on the PR equalized signal to generate binarized data. Note that this binarized data is supplied to the encoding/decoding unit 17 illustrated in FIG. 1, and subject to the reproduction data demodulation processing.

In the Viterbi decoding, a Viterbi detector including a plurality of states constituted with consecutive bits of a predetermined length as a unit and a branch represented by a transition between the states is used, and a desired bit sequence can be efficiently detected from among all possible bit sequences.

In the PR convolver 65, convolution processing is performed on a binarization result to generate a target signal Zk.

The equalization error computing unit 66 obtains the equalization error ek from the equalization signal y0 from the multiple input adaptive equalizer and the target signal Zk, and supplies the equalization error ek to the multiple input adaptive equalizer 112 illustrated in FIG. 12 for the tap coefficient control.

Here, as described earlier with reference to FIG. 7, the equalization error computing unit 66 includes the subtractor 91 and the coefficient multiplier 92.

The subtractor 81 subtracts the target signal Zk from the equalization signal y0.

The equalization error ek is generated by multiplying the subtraction result by a predetermined coefficient a using the coefficient multiplier 82.

In the configuration illustrated in FIG. 12, in the configuration for executing the 2T sampling reproduction processing, the adaptive equalizers 112-1 to 112-n, which execute the adaptive equalization processing on the respective channel signals as the elements of the reproduction signal, and the adaptive equalizer 125 that performs the laser noise adaptive equalization processing are disposed in parallel.

That is, all of the adaptive equalizers 121-1 to 121-n and the adaptive equalizer 125 illustrated in FIG. 12 input the equalization error signal (ek) generated by the equalization error computing unit (see FIG. 7) set inside the signal identification unit 114, and execute the adaptive equalization processing.

Each of the adaptive equalizers 112-1 to 112-n and 125 includes, for example, the FIR filter illustrated in FIG. 6 described earlier.

That is, each of the adaptive equalizers 112-1 to 112-n and 125 is, as illustrated in FIG. 6, the filter having the n+1 stage tap including the delay elements 80-1 to 80-n, the coefficient multipliers 81-0 to 81-n, and the adder 84.

The coefficient multipliers 81-0 to 81-n multiply the input x at each time point by the tap coefficients C0 to Cn.

The outputs of the coefficient multipliers 81-0 to 81-n are added by the adder 84 to be the output y.

The tap coefficients C0 to Cn are controlled to perform the adaptive equalization processing. For that purpose, there are provided the equalization error ek and computing units 82-0 to 82-n that perform arithmetic operation by each tap input being input. In addition, there are provided integrators 83-0 to 83-n that integrate outputs of respective computing units 82-0 to 82-n.

In each of the computing units 82-0 to 82-n, for example, the arithmetic operation of $-1 \times ek \times x$ is performed. The outputs of the computing units 82-0 to 82-n are integrated by the integrators 83-0 to 83-n, and the tap coefficients C0 to Cn of the coefficient multipliers 81-0 to 81-n are changed and controlled on the basis of the integration result. Here, the integration of the integrators 83-0 to 83-n is performed in order to adjust the responsiveness of the adaptive coefficient control.

Using the configuration described above, the binarized data is decoded after the processing for cancelling the crosstalk and reducing the laser noise is performed.

Each of the adaptive equalizers 112-1 to 112-n and 125 has the configuration illustrated in FIG. 6, and the same equalization error ek is supplied to perform the adaptive equalization.

First, in the adaptive equalizers 112-1 to 112-n to which the channel signals corresponding to the reproduction signals are input, the error and phase distortion of an input signal frequency component of a reproduction channel signal is optimized, in other words, the adaptive PR equalization is performed. This is the same as the function of a normal adaptive equalizer.

That is, the tap coefficients C0 to Cn are adjusted corresponding to the arithmetic operation result of $-1 \times ek \times x$ in each of the computing units 82-0 to 82-n illustrated in FIG. 6, and the tap coefficients C0 to Cn are adjusted in the direction in which the equalization error is eliminated.

Meanwhile, in the adaptive equalizer 125 to which the laser noise (LNin) is input, an output target is uncorrelated with the reproduction signal. Accordingly, in the adaptive equalizer 125, arithmetic operation is performed in such a manner that a correlation component, that is, the laser noise component is canceled.

That is, in the case of the adaptive equalizer 125, the tap coefficients C0 to Cn are adjusted corresponding to the arithmetic operation result of $-1 \times ek \times x$ in each of the computing units 82-0 to 82-n, and the tap coefficients C0 to Cn are adjusted such that the frequency characteristic in the direction in which the noise component is eliminated in the addition result of the adder 113 in FIG. 10 can be obtained.

In this manner, in the adaptive equalizers 112-1 to 112-n, the tap coefficients C0 to Cn are adaptively controlled in the direction in which the target frequency characteristic is obtained using the equalization error ek, whereas in the adaptive equalizer 125, the tap coefficients C0 to Cn are automatically controlled in the direction in which the frequency characteristic effective for reducing the laser noise is obtained using the equalization error ek. As a result, the equalization signal y0 of the multiple input adaptive equalizer 112, which is obtained by adding the outputs of the respective adaptive equalizers 112-1 to 112-n and 125 using the adder 113, becomes a signal in which the laser noise is reduced.

As described above, according to the present Example 4, that is, the configuration illustrated in FIG. 12, in the 2T sampling reproduction configuration, the multiple input adaptive equalizer 112 includes the adaptive equalizers corresponding to the respective channels of the reproduction signal and the adaptive equalizer corresponding to the laser noise that are disposed in parallel.

The equalization error signal (ek) is input to those adaptive equalizers, the adaptive equalizer corresponding to the reproduction signal adaptively controls the tap coefficients C0 to Cn in the direction in which the target frequency characteristic is obtained, and the adaptive equalizer 125 corresponding to the laser noise controls the tap coefficients C0 to Cn in the direction in which the frequency characteristic for reducing the laser noise is obtained. A high-quality reproduction signal in which the laser noise is reduced can be generated by performing the adaptive equalization processing as described above.

3-5. (Example 5) Example of Information Processing Apparatus Having 1T Sampling Configuration for Reducing Laser Noise in Reproduction Signal Next, an example of the information processing apparatus having a 1T sampling configuration in which the laser noise is reduced from the reproduction signal of the optical disk will be described as Example 5 with reference to FIG. 13.

The present Example 5 is an example in which the reproduction signal with reduced laser noise is output in a configuration for performing the 1T sampling in which, assuming that the channel clock period is "T", the recording signal having the mark length of 1T or more recorded in the optical disk 10 is read and the reproduction processing is executed.

Figure 13:
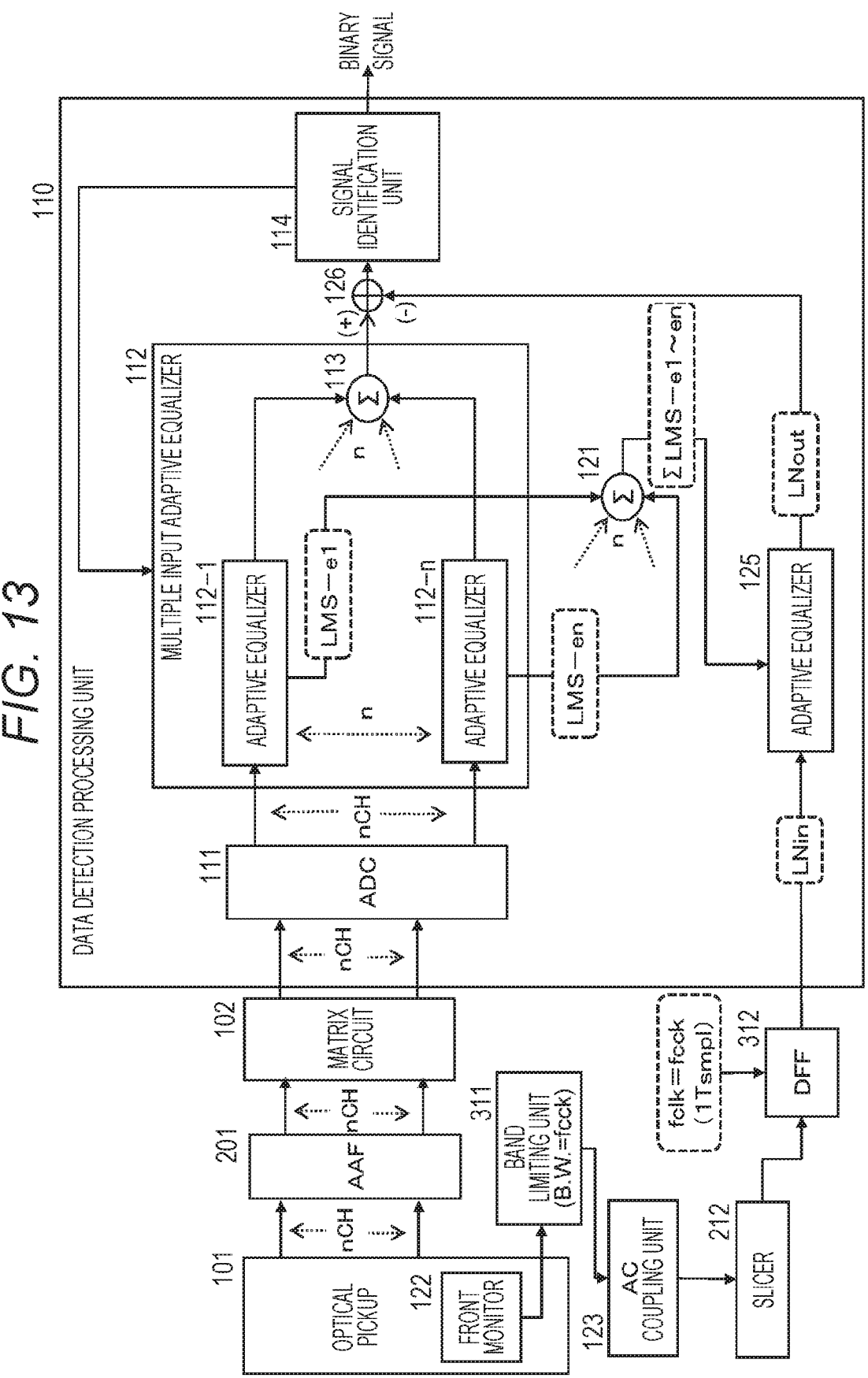
FIG. 13 is a diagram illustrating another exemplary configuration for reducing the laser noise included in the reproduction signal.

FIG. 13 is a diagram illustrating a configuration of the present example.

FIG. 13 is a diagram illustrating a configuration in which the 2T sampling configuration illustrated in FIG. 11 described earlier as Example 3 is changed to a configuration for performing the 1T sampling.

The detection signals corresponding to the respective divided areas of the optical pickup 101 are input to the anti-aliasing filter (AAF) 201. The anti-aliasing filter (AAF) 201 functions as the noise removal filter that removes the signal having the mark length of 1T or less as noise.

The output of the anti-aliasing filter (AAF) 201 is the reproduction signal having the mark length of 1T or more, in other words, a 1T sampling reproduction signal.

The 1T sampling reproduction signal is supplied to the matrix circuit 102, and the reproduction signals of the plurality of channels (n-channel reproduction signals) corresponding to the respective areas are obtained.

The reproduction signal of the plurality of channels (n-channel reproduction signal) generated by the matrix circuit 102 is input to the A/D converter (ADC) 111 of the data detection processing unit 110, converted into the digital signal, and input to the multiple input adaptive equalizer 112.

The multiple input adaptive equalizer 112 includes adaptive equalizers 112-1 to 112-n of the number of n corresponding to respective input signals (n-channel signals), and the respective channel signals are input to the adaptive equalizers 112-1 to 112-n.

Each of the adaptive equalizers 112-1 to 112-n includes, for example, the finite impulse response (FIR) filter, and the least means square transversal filter (LMSTVF) provided with the tap coefficient computing unit that executes the updating operation processing of the tap coefficient using the least squares method.

That is, each of the adaptive equalizers 112-1 to 112-n has the FIR configuration described earlier with reference to FIG. 6, and the tap coefficients C0 to Cn are adaptively controlled in the direction in which the target frequency characteristic is obtained using the equalization error ek.

The outputs of the adaptive equalizers 121-1 to 121-n are added by the adder 113, and the equalization signal of the multiple input adaptive equalizer 112, which is the addition signal, is input to the signal identification unit 114 via a subtractor 126. The equalization signal output from the multiple input adaptive equalizer 112 is a signal in which the crosstalk and the like are reduced.

Note that the signal identification unit 114 illustrated in FIG. 13 includes the binarization detector 64, the PR convolver 65, and the equalization error computing unit 66 illustrated in FIG. 4.

A binary signal for ultimate reproduction signal generation is generated in the signal identification unit 114, and an equalization error signal that is fed back and input to the adaptive equalizer is generated. Those processes will be described later.

The front monitor 122 is provided inside the optical pickup 101, which is a monitoring circuit for the laser light output from the laser diode inside the optical pickup 101. The front monitor 122 obtains the monitoring signal of the laser signal (emitted light) output from the laser diode inside the optical pickup 101, and outputs the reference signal based on the emitted light of the laser diode.

This monitoring signal is the component same as the laser light component with which the optical disk 10 is irradiated, which is the laser light including the noise component.

The front monitor 122 inputs this monitoring laser signal to a band limiting unit (B.W.=fcck) 311.

The band limiting unit (B.W.=fcck) 311 executes the band limiting processing according to the frequency band of the channel clock frequency (fcck).

This is the processing for removing the laser light component corresponding to a frequency higher than the band to be reproduced in the 1T sampling reproduction processing.

Subsequently, the band-limited laser light signal generated by the band limiting unit (B.W.=fcck) 311 is input to the AC coupling unit 123.

The AC coupling unit 123 separates the noise component and the DC component other than the noise, and extracts the noise signal from which the DC component has been removed.

The noise component signal in the laser light extracted by the AC coupling unit 123 is input to the slicer 212. The slicer 212 generates a binary signal to which a prescribed threshold value is applied. In other words, processing for generating the digital signal is performed.

The laser noise binary signal generated by the slicer 212 is input to the adaptive equalizer 125 through a digital flip flop (DFF) 312.

The digital flip flop (DFF) 312 executes the sampling processing based on the 1T sampling of the laser noise binary signal generated by the slicer 212.

That is, with those configurations, a 1T sampling laser noise signal (LNin) corresponding to the 1T sampling reproduction signal is generated and input to the adaptive equalizer 125.

The adaptive equalizer 125 performs the adaptive equalization processing on the input signal (LNin), and outputs the output signal (LNout).

The adaptive equalizer 125 has the FIR configuration described earlier with reference to FIG. 6.

As described earlier with reference to FIG. 6, the adaptive equalizer adaptively controls the tap coefficients C0 to Cn in the direction in which the target frequency characteristic is obtained using the equalization error ek, and generates the output signal.

The input LNin to the adaptive equalizer 125 illustrated in FIG. 13 corresponds to the input signal (xi) to the FIR configuration illustrated in FIG. 6.

The output LNout from the adaptive equalizer 125 corresponds to an output signal (yi) from the FIR configuration illustrated in FIG. 6.

Further, the adaptive equalizer 125 illustrated in FIG. 13 inputs the addition signal (ΣLMS-e1 to en) generated in the adder 121 as the equalization error signal (ek) in the configuration illustrated in FIG. 6.

Respective signals of the LMS-e1 to LMS-en correspond to the equalization error signals input to the adaptive equalizers 112-1 to 112-n that execute the adaptive equalization processing on respective signals of the n channels of the optical pickup 101, that is, the equalization error (ek) illustrated in FIG. 6.

In this manner, the addition signal (ΣLMS-e1 to en) of the equalization error signals input to the adaptive equalizers 112-1 to 112-n is input to the adaptive equalizer 125 illustrated in FIG. 13, and the adaptive equalization is performed.

That is, the adaptive equalizer 125 adjusts the tap coefficient in the direction in which the equalization error (ΣLMS-e1 to en) is eliminated to optimize the error and phase distortion of the laser noise signal (LNin) to be input, in other words, to perform the adaptive PR equalization, and generates and outputs the laser noise output (LNout) close to a true noise component in which an error component and the like included in the laser noise signal (LNin) to be input are excluded.

The output signal (LNout) having been subject to the adaptive equalization output from the adaptive equalizer 125 is a signal close to the true noise component in the laser light.

This output signal (LNout) is input to the subtractor 126.

The subtractor 126 executes processing in which the output from the adaptive equalizer 125, that is, the noise signal (LNout) included in the laser light is subtracted from an addition value of adaptive equalization signals that are the outputs from the adaptive equalizers 112-1 to 112-n that execute the adaptive equalization processing on the respective signals of the n channels of the optical pickup 101.

By this subtraction processing, the laser noise component is subtracted from the adaptive equalization signal obtained as the reproduction signal, and the adaptive equalization signal with less noise is input to the signal identification unit 114.

As described earlier, the signal identification unit 114 includes the binarization detector 64, the PR convolver 65, and the equalization error computing unit 66 illustrated in FIG. 4.

The binarization detector 64 is, for example, the Viterbi decoder, and performs the maximum likelihood decoding processing on the PR equalized signal to generate binarized data. Note that this binarized data is supplied to the encoding/decoding unit 17 illustrated in FIG. 1, and subject to the reproduction data demodulation processing.

In the Viterbi decoding, a Viterbi detector including a plurality of states constituted with consecutive bits of a predetermined length as a unit and a branch represented by a transition between the states is used, and a desired bit sequence can be efficiently detected from among all possible bit sequences.

In the PR convolver 65, convolution processing is performed on a binarization result to generate a target signal Zk.

The equalization error computing unit 66 obtains the equalization error ek from the equalization signal y0 from the multiple input adaptive equalizer and the target signal Zk, and supplies the equalization error ek to the multiple input adaptive equalizer 112 illustrated in FIG. 13 for the tap coefficient control.

Here, as described earlier with reference to FIG. 7, the equalization error computing unit 66 includes the subtractor 91 and the coefficient multiplier 92.

The subtractor 81 subtracts the target signal Zk from the equalization signal y0.

The equalization error ek is generated by multiplying the subtraction result by a predetermined coefficient a using the coefficient multiplier 82.

As described above, the configuration of Example 5 illustrated in FIG. 13 includes, in the configuration for executing the 1T sampling reproduction processing, the adaptive equalizer 125 illustrated in FIG. 11 in order to obtain an accurate value of the laser noise included in the laser light output from the optical pickup 101.

The adaptive equalizer 125 illustrated in FIG. 11 executes the adaptive equalization processing using the equalization error signals input to the adaptive equalizers 112-1 to 112-n that execute the adaptive equalization processing on the respective signals of the n channels of the optical pickup 101.

That is, the adaptive equalizer 125 adjusts the tap coefficient in the direction in which the equalization error (ΣLMS-e1 to en) is eliminated to optimize the error and the phase distortion of the input laser noise signal (LNin), and generates the laser noise output (LNout) close to the true noise component.

The output signal (LNout) having been subject to the adaptive equalization output from the adaptive equalizer 125 is, in the subtractor 126, subtracted from the addition value of the adaptive equalization signals that is the output from the adaptive equalizers 112-1 to 112-n.

By this subtraction processing, the laser noise component is subtracted from the adaptive equalization signal obtained as the reproduction signal, and the adaptive equalization signal with less noise is generated.

As a result of this processing, the equalization error signal in which the laser noise component is reduced is supplied to the adaptive equalizers 112-1 to 112-n that execute the adaptive equalization processing on the respective signals of the n channels of the optical pickup 101, and the adaptive equalization signal to be eventually obtained and the reproduction signal become a high-quality reproduction signal in which the laser noise component is reduced.

3-6. (Example 6) Example of Information Processing Apparatus Having 1T Sampling Configuration for Reducing Laser Noise in Reproduction Signal Next, an example of the information processing apparatus having the 1T sampling configuration in which the laser noise is reduced from the reproduction signal of the optical disk will be described as Example 6 with reference to FIG. 14.

The present Example 6 is an example in which the reproduction signal with reduced noise is output in the configuration for performing the 1T sampling in which, assuming that the channel clock period is "T", the recording signal having the mark length of 1T or more recorded in the optical disk 10 is read and the reproduction processing is executed.

Figure 14:
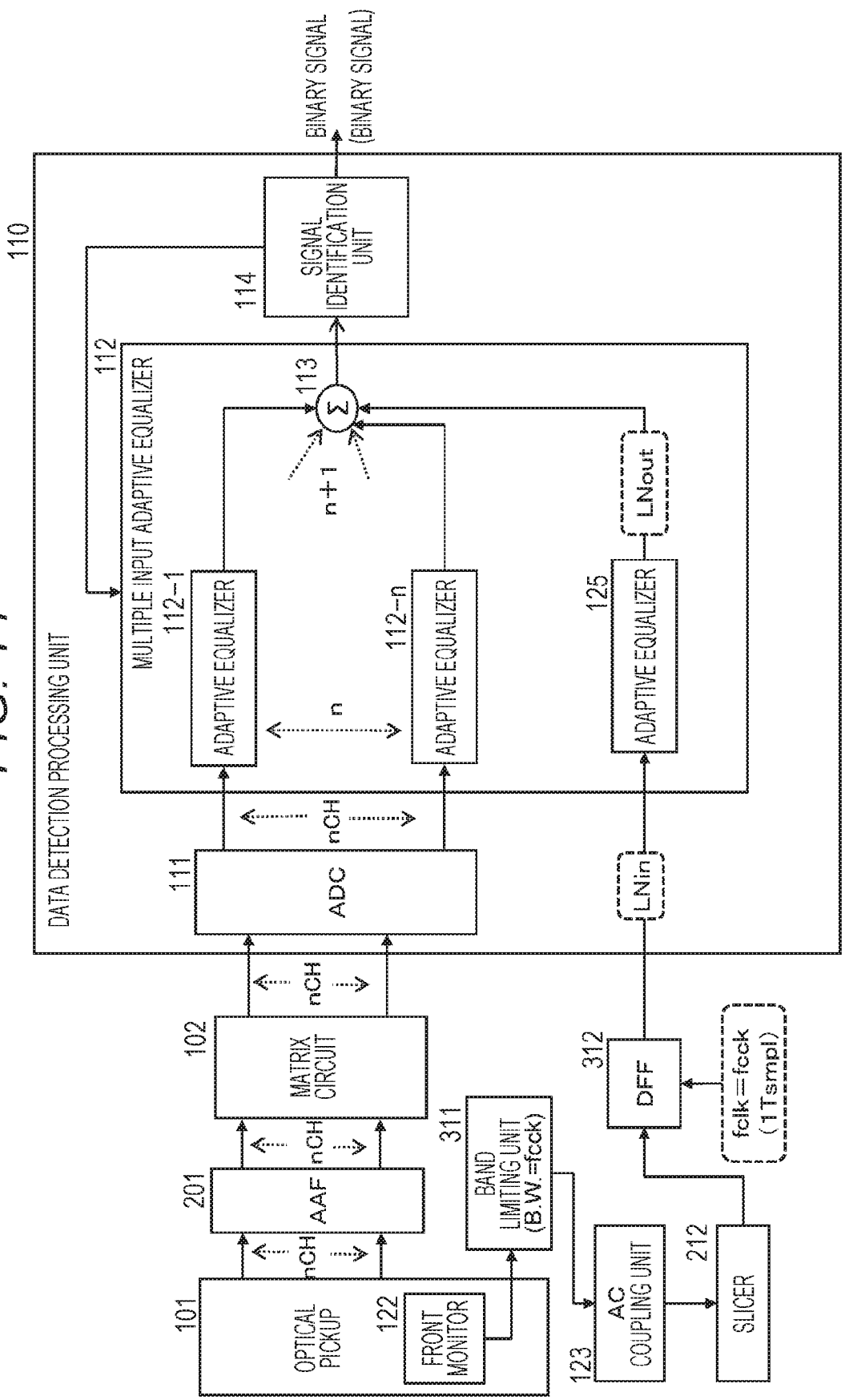
FIG. 14 is a diagram illustrating another exemplary configuration for reducing the laser noise included in the reproduction signal.

FIG. 14 is a diagram illustrating a configuration of the present example.

FIG. 14 is a diagram illustrating a detailed configuration in which the 2T sampling configuration illustrated in FIG. 12 described earlier as Example 4 is changed to the configuration for performing the 1T sampling.

The detection signals corresponding to the respective divided areas of the optical pickup 101 are input to the anti-aliasing filter (AAF) 201. The anti-aliasing filter (AAF) 201 functions as the noise removal filter that removes the signal having the mark length of 1T or less as noise.

The output of the anti-aliasing filter (AAF) 201 is the reproduction signal having the mark length of 1T or more, in other words, a 1T sampling reproduction signal.

The 1T sampling reproduction signal is supplied to the matrix circuit 102, and the reproduction signals of the plurality of channels (n-channel reproduction signals) corresponding to the respective areas are obtained.

The reproduction signal of the plurality of channels (n-channel reproduction signal) generated by the matrix circuit 102 is input to the A/D converter (ADC) 111 of the data detection processing unit 110, converted into the digital signal, and input to the multiple input adaptive equalizer 112.

The multiple input adaptive equalizer 112 includes adaptive equalizers 112-1 to 112-n of the number of n corresponding to respective input signals (n-channel signals), and the respective channel signals are input to the adaptive equalizers 112-1 to 112-n.

The multiple input adaptive equalizer 112 according to the present Example 6 includes, similarly to that according to Example 2 described earlier with reference to FIG. 10, the adaptive equalizers 112-1 to 112-n of the number of n to which the respective input signals (n-channel signals) are input and the adaptive equalization processing is performed on the respective channel signals, and the adaptive equalizer 125 that performs the adaptive equalization processing on the laser noise, which is similar to that described with reference to FIG. 9.

The input signal (Lnin) to the adaptive equalizer 125 is a signal generated through the front monitor 122, the band limiting unit (B.W.=fcck) 311, the AC coupling unit 123, the slicer 212, and the digital flip flop (DFF) 312.

The front monitor 122 is provided inside the optical pickup 101, which is a monitoring circuit for the laser light output from the laser diode inside the optical pickup 101. The front monitor 122 obtains the monitoring signal of the laser signal (emitted light) output from the laser diode inside the optical pickup 101, and outputs the reference signal based on the emitted light of the laser diode.

This monitoring signal is the component same as the laser light component with which the optical disk 10 is irradiated, which is the laser light including the noise component.

The front monitor 122 inputs this monitoring laser signal to a band limiting unit (B.W.=fcck) 311.

The band limiting unit (B.W.=fcck) 311 executes the band limiting processing according to the frequency band of the channel clock frequency (fcck).

This is the processing for removing the laser light component corresponding to a frequency higher than the band to be reproduced in the 1T sampling reproduction processing.

Subsequently, the band-limited laser light signal generated by the band limiting unit (B.W.=fcck) 311 is input to the AC coupling unit 123.

The AC coupling unit 123 separates the noise component and the DC component other than the noise, and extracts the noise signal from which the DC component has been removed.

The noise component signal in the laser light extracted by the AC coupling unit 123 is input to the slicer 212. The slicer 212 generates a binary signal to which a prescribed threshold value is applied. In other words, processing for generating the digital signal is performed.

The laser noise binary signal generated by the slicer 212 is input to the adaptive equalizer 125 through a digital flip flop (DFF) 312.

The digital flip flop (DFF) 312 executes the sampling processing based on the 1T sampling of the laser noise binary signal generated by the slicer 212.

That is, with those configurations, a 1T sampling laser noise signal (LNin) corresponding to the 1T sampling reproduction signal is generated and input to the adaptive equalizer 125.

The adaptive equalizer 125 performs the adaptive equalization processing on the input signal (LNin), and outputs the output signal (LNout).

Each of the adaptive equalizers 112-1 to 112-n, which executes the adaptive equalization processing on each channel signal corresponding to a read signal of the pickup 101, and the adaptive equalizer 125 that executes the adaptive equalization processing on the laser noise (LNin) include, for example, the finite impulse response (FIR) filter, and the least means square transversal filter (LMSTVF) provided with the tap coefficient computing unit that executes the updating operation processing of the tap coefficient using the least squares method.

The outputs of the adaptive equalizers 121-1 to 121-n and the output of the adaptive equalizer 125 are added by the adder 113, and this addition signal is input to the signal identification unit 114.

Note that the signal identification unit 114 illustrated in FIG. 14 includes the binarization detector 64, the PR convolver 65, and the equalization error computing unit 66 illustrated in FIG. 4.

A binary signal for ultimate reproduction signal generation is generated in the signal identification unit 114, and an equalization error signal that is fed back and input to the adaptive equalizer is generated.

The binarization detector 64 is, for example, the Viterbi decoder, and performs the maximum likelihood decoding processing on the PR equalized signal to generate binarized data. Note that this binarized data is supplied to the encoding/decoding unit 17 illustrated in FIG. 1, and subject to the reproduction data demodulation processing.

In the Viterbi decoding, a Viterbi detector including a plurality of states constituted with consecutive bits of a predetermined length as a unit and a branch represented by a transition between the states is used, and a desired bit sequence can be efficiently detected from among all possible bit sequences.

In the PR convolver 65, convolution processing is performed on a binarization result to generate a target signal Zk.

The equalization error computing unit 66 obtains the equalization error ek from the equalization signal y0 from the multiple input adaptive equalizer and the target signal Zk, and supplies the equalization error ek to the multiple input adaptive equalizer 112 illustrated in FIG. 14 for the tap coefficient control.

Here, as described earlier with reference to FIG. 7, the equalization error computing unit 66 includes the subtractor 91 and the coefficient multiplier 92.

The subtractor 81 subtracts the target signal Zk from the equalization signal y0.

The equalization error ek is generated by multiplying the subtraction result by a predetermined coefficient a using the coefficient multiplier 82.

In the configuration illustrated in FIG. 14, in the configuration for executing the 1T sampling reproduction processing, the adaptive equalizers 112-1 to 112-$n$, which execute the adaptive equalization processing on the respective channel signals as the elements of the reproduction signal, and the adaptive equalizer 125 that performs the laser noise adaptive equalization processing are disposed in parallel.

That is, all of the adaptive equalizers 121-1 to 121-$n$ and the adaptive equalizer 125 illustrated in FIG. 14 input the equalization error signal (ek) generated by the equalization error computing unit (see FIG. 7) set inside the signal identification unit 114, and execute the adaptive equalization processing.

Each of the adaptive equalizers 112-1 to 112-$n$ and 125 includes, for example, the FIR filter illustrated in FIG. 6 described earlier.

That is, each of the adaptive equalizers 112-1 to 112-$n$ and 125 is, as illustrated in FIG. 6, the filter having the n+1 stage tap including the delay elements 80-1 to 80-$n$, the coefficient multipliers 81-0 to 81-$n$, and the adder 84.

The coefficient multipliers 81-0 to 81-$n$ multiply the input x at each time point by the tap coefficients C0 to Cn.

The outputs of the coefficient multipliers 81-0 to 81-$n$ are added by the adder 84 to be the output y.

The tap coefficients C0 to Cn are controlled to perform the adaptive equalization processing. For that purpose, there are provided the equalization error ek and computing units 82-0 to 82-$n$ that perform arithmetic operation by each tap input being input. In addition, there are provided integrators 83-0 to 83-$n$ that integrate outputs of respective computing units 82-0 to 82-$n$.

In each of the computing units 82-0 to 82-$n$, for example, the arithmetic operation of −1×ek×x is performed. The outputs of the computing units 82-0 to 82-$n$ are integrated by the integrators 83-0 to 83-$n$, and the tap coefficients C0 to Cn of the coefficient multipliers 81-0 to 81-$n$ are changed and controlled on the basis of the integration result. Here, the integration of the integrators 83-0 to 83-$n$ is performed in order to adjust the responsiveness of the adaptive coefficient control.

Using the configuration described above, the binarized data is decoded after the processing for cancelling the crosstalk and reducing the laser noise is performed.

Each of the adaptive equalizers 112-1 to 112-$n$ and 125 has the configuration illustrated in FIG. 6, and the same equalization error ek is supplied to perform the adaptive equalization.

First, in the adaptive equalizers 112-1 to 112-$n$ to which the channel signals corresponding to the reproduction signals are input, the error and phase distortion of an input signal frequency component of a reproduction channel signal is optimized, in other words, the adaptive PR equalization is performed. This is the same as the function of a normal adaptive equalizer.

That is, the tap coefficients C0 to Cn are adjusted corresponding to the arithmetic operation result of −1×ek×x in each of the computing units 82-0 to 82-$n$ illustrated in FIG. 6, and the tap coefficients C0 to Cn are adjusted in the direction in which the equalization error is eliminated.

Meanwhile, in the adaptive equalizer 125 to which the laser noise (LNin) is input, an output target is uncorrelated with the reproduction signal. Accordingly, in the adaptive equalizer 125, arithmetic operation is performed in such a manner that a correlation component, that is, the laser noise component is canceled.

That is, in the case of the adaptive equalizer 125, the tap coefficients C0 to Cn are adjusted corresponding to the arithmetic operation result of −1×ek×x in each of the computing units 82-0 to 82-$n$, and the tap coefficients C0 to Cn are adjusted such that the frequency characteristic in the direction in which the noise component is eliminated in the addition result of the adder 113 in FIG. 10 can be obtained.

In this manner, in the adaptive equalizers 112-1 to 112-$n$, the tap coefficients C0 to Cn are adaptively controlled in the direction in which the target frequency characteristic is obtained using the equalization error ek, whereas in the adaptive equalizer 125, the tap coefficients C0 to Cn are automatically controlled in the direction in which the frequency characteristic effective for reducing the laser noise is obtained also using the equalization error ek. As a result, the equalization signal y0 of the multiple input adaptive equalizer 112, which is obtained by adding the outputs of the respective adaptive equalizers 112-1 to 112-$n$ and 125 using the adder 113, becomes a signal in which the laser noise is reduced.

As described above, according to the present Example 6, that is, the configuration illustrated in FIG. 14, the multiple input adaptive equalizer 112 includes the adaptive equalizers corresponding to the respective channels of the reproduction signal and the adaptive equalizer corresponding to the laser noise that are disposed in parallel.

The equalization error signal (ek) is input to those adaptive equalizers, the adaptive equalizer corresponding to the reproduction signal adaptively controls the tap coefficients C0 to Cn in the direction in which the target frequency characteristic is obtained, and the adaptive equalizer 125 corresponding to the laser noise controls the tap coefficients C0 to Cn in the direction in which the frequency characteristic for reducing the laser noise is obtained. A high-quality reproduction signal in which the laser noise is reduced can be generated by performing the adaptive equalization processing as described above.

4. OTHER EXAMPLES

In the examples described above, as the optical pickup, the examples using the optical pickup in which the light receiving area described with reference to FIG. 3 is divided into areas and the reproduction signal based on the channel signals corresponding to the amount of received light in the respective divided areas is generated have been described.

The optical pickup illustrated in FIG. 3 is an example, and the laser noise reduction processing configuration of the present disclosure is not limited to the pickup of the area division type in the mode illustrated in FIG. 3. It can also be applied to a configuration using the optical pickup in various modes. Specifically, the processing of the present disclosure can be applied to a configuration using the area division type optical pickup such as a three-division type, a five-division type, and the like or a no division type optical pickup having no divided area.

In the examples described with reference to FIGS. 9 to 14, the plurality of channel signals obtained from the optical pickup is input to the adaptive equalizers 112-1 to 112-n, respectively. However, in a configuration using the no division type optical pickup having no divided area, for example, one reproduction signal input from the optical pickup may be input to one adaptive equalizer 112-1, and the laser noise may be input to another adaptive equalizer 125.

With such a configuration as well, a high-quality reproduction signal in which the laser noise is reduced from the reproduction signal can be obtained.

Further, although all the examples described above are examples in which the laser noise included in the reproduction signal is reduced according to the reproduction configuration of the optical disk, the laser noise reduction processing configuration of the present disclosure can be used, in addition to the reproduction of the optical disk, in various other laser light utilization fields.

For example, it can be applied to a laser light communication configuration using laser light.

In a laser communication device including a transmitter for transmitting a communication signal on the laser light, and a receiver for receiving the laser light transmitted from the transmitter and analyzing the communication signal included in the laser light, the above-described configuration for removing the laser noise can be used to the transmitter or the receiver.

The adaptive equalizer 112-1 (to 112-n) corresponding to the channel as the reproduction signal in each of the example described above is set as the adaptive equalizer corresponding to communication data included in the laser light for communication, and the adaptive equalizer 125 corresponding to the laser noise in each of the example described above is set as the adaptive equalizer corresponding to noise included in the laser light for communication.

Using the adaptive equalizer having such a setting, the processing similar to that in each example described above is executed, whereby high-quality laser communication data in which the laser noise is reduced from the laser light communicated between the transmitter and the receiver can be extracted.

5. SUMMARY OF CONFIGURATIONS IN PRESENT DISCLOSURE

The examples of the present disclosure have been described in detail with reference to specific examples. However, it is obvious that those skilled in the art can modify or replace the examples without departing from the gist of the present disclosure. That is, the present invention has been disclosed in the form of exemplification, and should not be interpreted in a restrictive manner. In order to determine the gist of the present disclosure, the scope of claims should be taken into consideration.

Note that the technique disclosed in the descriptions can take the following configuration.

(1) An information processing apparatus, including:
a photodetector that outputs a signal based on reflected light from a disk with respect to light emitted from a laser diode;
a front monitor that outputs a reference signal based on the light emitted from the laser diode; and
a data detection processing unit to which an output signal of the photodetector is input, which generates a reproduction signal, in which
the data detection processing unit includes:
a reproduction signal adaptive equalizer to which the output signal of the photodetector is input, which outputs an equalization signal by adaptive equalization processing based on an input signal;
a laser noise adaptive equalizer to which a laser noise signal included in the reference signal output from the front monitor is input, which outputs the equalization signal by the adaptive equalization processing based on the input signal;
a computing unit that executes arithmetic operation on an output of the reproduction signal adaptive equalizer and an output of the laser noise adaptive equalizer; and
a signal identification unit that generates an identifying signal on the basis of an output of the computing unit.

(2) The information processing apparatus according to (1), in which
the signal identification unit generates, on the basis of an input of the computing unit, an equalization error signal to be applied to the adaptive equalization processing in the reproduction signal adaptive equalizer, which is output to the reproduction signal adaptive equalizer, and
the laser noise adaptive equalizer inputs a sum total of the equalization error signal input to the reproduction signal adaptive equalizer as the equalization error signal to be applied to the adaptive equalization processing in the laser noise adaptive equalizer.

(3) The information processing apparatus according to (2), in which
the photodetector is a multi-channel signal output type photodetector that outputs a plurality of channel signals corresponding to an amount of received light in a unit of a divided area, and
the reproduction signal adaptive equalizer is a multiple input adaptive equalizer including a plurality of adaptive equalizers to which respective signals of the plurality of channel signals output from the photodetector are input.

(4) The information processing apparatus according to (3), in which
the laser noise adaptive equalizer inputs the sum total of the equalization error signal input to the plurality of adaptive equalizers included in the multiple input adaptive equalizer as the equalization error signal to be applied to the adaptive equalization processing in the laser noise adaptive equalizer.

(5) The information processing apparatus according to (3) or (4), in which
the computing unit subtracts an output value of the laser noise adaptive equalizer from an addition value of outputs of the plurality of adaptive equalizers included in the multiple input adaptive equalizer.

(6) The information processing apparatus according to any one of (1) to (5), in which
the signal identification unit generates, on the basis of the input of the computing unit, the equalization error signal to be applied to the adaptive equalization processing in the reproduction signal adaptive equalizer and the laser noise adaptive equalizer, which is output to the reproduction signal adaptive equalizer and the laser noise adaptive equalizer, and
the reproduction signal adaptive equalizer and the laser noise adaptive equalizer execute the adaptive equalization processing to which the equalization error signal is applied.

(7) The information processing apparatus according to (6), in which the photodetector is a multi-channel signal output type photodetector that outputs a plurality of channel signals corresponding to an amount of received light in a unit of a divided area, and the reproduction signal adaptive equalizer is a multiple input adaptive equalizer including a plurality of adaptive equalizers to which respective signals of the plurality of channel signals output from the photodetector are input.

(8) The information processing apparatus according to (7), in which the computing unit executes addition processing of an output of the plurality of adaptive equalizers included in the multiple input adaptive equalizer and an output value of the laser noise adaptive equalizer.

(9) The information processing apparatus according to any one of (1) to (8), in which the reproduction signal adaptive equalizer has a configuration in which a digital signal obtained by converting the output signal of the photodetector in a reproduction signal A/D converter (ADC) is input, and the laser noise adaptive equalizer has a configuration in which a digital signal obtained by converting, in a laser noise A/D converter (ADC), the laser noise signal obtained as an analog signal from the front monitor is input.

(10) The information processing apparatus according to (9), in which a relationship between a sampling frequency of the reproduction signal A/D converter (ADC) (fs1) and a sampling frequency of the laser noise A/D converter (fs2) is represented by fs2≥fs1.

(11) The information processing apparatus according to any one of (1) to (10), in which the signal identification unit includes a binarization processing unit that executes binarization processing based on an output signal of the computing unit and generates the reproduction signal.

(12) The information processing apparatus according to (11), in which the binarization processing unit executes maximum likelihood decoding processing as the binarization processing with respect to the output signal of the computing unit.

(13) The information processing apparatus according to (11) or (12), in which the signal identification unit includes:

a pertial response (PR) convolver that generates a equalization target signal on the basis of a binary signal generated by the binarization processing unit; and an equalization error computing unit that calculates an equalization error from the equalization target signal and the output signal of the computing unit, and the equalization error is input to the reproduction signal adaptive equalizer and the adaptive equalization processing is executed by the reproduction signal adaptive equalizer.

(14) The information processing apparatus according to any one of (1) to (13), in which the photodetector outputs a plurality of signals corresponding to the amount of received light in the unit of the divided area, an output of the photodetector is input to a matrix operation circuit, the matrix operation circuit outputs the plurality of signals corresponding to the amount of received light in the unit of the divided area of the photodetector, and the reproduction signal adaptive equalizer is the multiple input adaptive equalizer including the plurality of adaptive equalizers to which respective signals of the plurality of signals output from the matrix operation circuit are input, which outputs the equalization signal by the adaptive equalization processing based on the input signal.

(15) An optical storage apparatus having a configuration of any one of (1) to (14).

(16) A method for processing information executed in an information processing apparatus, the method including:

processing of outputting a signal based on reflected light from a disk with respect to light emitted from a laser diode using a photodetector;

processing of outputting a reference signal based on the light emitted from the laser diode using a front monitor; and executing data detection processing by inputting an output signal of the photodetector to a data detection processing unit and generating a reproduction signal using the data detection processing unit, in which in the data detection processing, the data detection processing unit executes:

processing of generating an equalization signal corresponding to a reproduction signal by an adaptive equalization processing based on the output signal of the photodetector;

processing of generating an equalization signal corresponding to laser noise by the adaptive equalization processing based on a laser noise signal included in the reference signal output from the front monitor;

arithmetic operation of the equalization signal corresponding to the reproduction signal and the equalization signal corresponding to the laser noise; and processing of generating an identifying signal based on the arithmetic operation result.

(17) A program for causing an information processing apparatus to execute information processing, the information processing apparatus including:

a photodetector that outputs a signal based on reflected light from a disk with respect to light emitted from a laser diode;

a front monitor that outputs a reference signal based on the light emitted from the laser diode; and a data detection processing unit to which an output signal of the photodetector is input, which generates a reproduction signal and executes data detection processing, the program causing the data detection processing unit to execute:

processing of generating an equalization signal corresponding to a reproduction signal by an adaptive equalization processing based on the output signal of the photodetector;

processing of generating an equalization signal corresponding to laser noise by the adaptive equalization processing based on a laser noise signal included in the reference signal output from the front monitor;

arithmetic operation of the equalization signal corresponding to the reproduction signal and the equalization signal corresponding to the laser noise; and processing of generating an identifying signal based on the arithmetic operation result.

Moreover, the series of processes described in the descriptions can be executed by hardware, software, or a combination of both of them. In the case of executing processing by software, a program in which a processing sequence is recorded may be installed in a memory in a computer incorporated in dedicated hardware and executed, or the program may be installed in a general-purpose computer capable of executing various processing and executed. For example, the program may be recorded in the recording medium in advance. In addition to installing from the recording medium to the computer, the program may be received via a network such as a local area network (LAN) and the Internet and installed in the recording medium such as a built-in hard disk.

Note that the various processes disclosed in the descriptions are not only executed in a time series manner in accordance with the descriptions but also may be executed in parallel or individually depending on the processing capability of the device for executing the processing or as necessary. In addition, in the descriptions, the term "system" refers to a logical group configuration of a plurality of devices, and is not limited to a system in which the devices of each configuration are in the same housing.

INDUSTRIAL APPLICABILITY

As described above, according to the configuration of an example of the present disclosure, the apparatus and the method for generating the reproduction signal in which laser noise is reduced are obtained.

Specifically, there are provided a photodetector (PD) that irradiates a disk with laser light and outputs a signal based on a reflected light from the disk, a front monitor that outputs a reference signal based on an emitted light of a laser diode, and a data detection processing unit to which an output signal of the PD is input to generate a reproduction signal. The data detection processing unit includes a reproduction signal adaptive equalizer that outputs an equalization signal by adaptive equalization processing based on the PD output signal, and a laser noise adaptive equalizer that outputs the equalization signal by the adaptive equalization processing based on a laser noise signal, and generates the reproduction signal in which the laser noise is reduced on the basis of an arithmetic operation result of the output of the reproduction signal adaptive equalizer and the output of the laser noise adaptive equalizer.

According to the present configuration, the apparatus and the method for generating the reproduction signal in which laser noise is reduced are obtained.

REFERENCE SIGNS LIST

10 Disk
11 Optical pickup
12 Spindle motor
13 Thread
14 Matrix circuit
15 Data detection processing unit
16 Wobble signal processing unit
17 ENC/DEC
18 Host I/F
19 Address decoder
20 System controller
21 Optical block servo circuit
22 Spindle servo circuit
24 Write strategy
25 Thread driver
26 ADIP demodulation processing unit
27 Spindle driver
28 Driver
30 Host device
41 Laser driver
42 Front monitor
51 Laser diode
52 Collimator lens
53 Polarizing beam splitter
54 Objective lens
55 Lens
56 Photodetector
61 ADC
62 PLL
63 Multiple input adaptive equalizer
64 Binarization detector
65 PR convolver
66 Equalization error computing unit
67 Adder circuit
71 to 75 Adaptive equalizer
76 Adder
80 Delay element
81 Coefficient multiplier
82 Computing unit
83 Integrator
84 Adder
91 Subtractor
92 Coefficient multiplier
101 Optical pickup
102 Matrix circuit
110 Data detection processing unit
111 ADC
112 Multiple input adaptive equalizer
112-1 to 112-$n$ Adaptive equalizer
113 Adder
114 Signal identification unit
121 Adder
122 Front monitor
123 AC coupling unit
124 ADC
125 Adaptive equalizer
126 Subtractor
211 Band limiting unit
212 Slicer
213 DFF
214 FIR filter
215 DFF
311 Band limiting unit
312 DFF

The invention claimed is:

1. An information processing apparatus, comprising:
a photodetector configured to output a signal based on reflected light from a disk with respect to light emitted from a laser diode;
a front monitor configured to output a reference signal based on the light emitted from the laser diode; and
a data detection processing unit to which an output signal of the photodetector is input, wherein
the data detection processing unit is configured to generate a reproduction signal, and
the data detection processing unit includes:
a reproduction signal adaptive equalizer to which the output signal of the photodetector is input, wherein the reproduction signal adaptive equalizer is configured to output an equalization signal by an adaptive equalization process based on an input signal;
a laser noise adaptive equalizer to which a laser noise signal included in the reference signal output from the front monitor is input, wherein the laser noise adaptive equalizer is configured to output the equalization signal by the adaptive equalization process based on the input signal;
a computing unit configured to execute an arithmetic operation on an output of the reproduction signal adaptive equalizer and an output of the laser noise adaptive equalizer; and a signal identification unit configured to generate an identifying signal based on an output of the computing unit.

2. The information processing apparatus according to claim 1, wherein
the signal identification unit is further configured to generate, based on an input of the computing unit, an equalization error signal to be applied to the adaptive equalization process in the reproduction signal adaptive equalizer,
the equalization error signal is output to the reproduction signal adaptive equalizer, and
the laser noise adaptive equalizer is further configured to input a sum total of the equalization error signal input to the reproduction signal adaptive equalizer as the equalization error signal to be applied to the adaptive equalization process in the laser noise adaptive equalizer.

3. The information processing apparatus according to claim 2, wherein
the photodetector is a multi-channel signal output type photodetector configured to output a plurality of channel signals corresponding to an amount of received light in a unit of a divided area, and
the reproduction signal adaptive equalizer is a multiple input adaptive equalizer including a plurality of adaptive equalizers to which respective signals of the plurality of channel signals output from the photodetector are input.

4. The information processing apparatus according to claim 3, wherein
the laser noise adaptive equalizer is further configured to input the sum total of the equalization error signal input to the plurality of adaptive equalizers as the equalization error signal to be applied to the adaptive equalization process in the laser noise adaptive equalizer.

5. The information processing apparatus according to claim 3, wherein the computing unit is further configured to subtract an output value of the laser noise adaptive equalizer from an addition value of outputs of the plurality of adaptive equalizers.

6. The information processing apparatus according to claim 1, wherein
the signal identification unit is further configured generate based on an input of the computing unit, an equalization error signal to be applied to the adaptive equalization process in the reproduction signal adaptive equalizer and the laser noise adaptive equalizer,
the equalization error signal is output to the reproduction signal adaptive equalizer and the laser noise adaptive equalizer, and
the reproduction signal adaptive equalizer and the laser noise adaptive equalizer are further configured to execute the adaptive equalization process to which the equalization error signal is applied.

7. The information processing apparatus according to claim 6, wherein
the photodetector is a multi-channel signal output type photodetector that is configured to output a plurality of channel signals corresponding to an amount of received light in a unit of a divided area, and
the reproduction signal adaptive equalizer is a multiple input adaptive equalizer including a plurality of adaptive equalizers to which respective signals of the plurality of channel signals output from the photodetector are input.

8. The information processing apparatus according to claim 7, wherein the computing unit is further configured to execute an addition process on an output of the plurality of adaptive equalizers and an output value of the laser noise adaptive equalizer.

9. The information processing apparatus according to claim 1, wherein
the reproduction signal adaptive equalizer has a configuration in which a digital signal obtained by conversion of the output signal of the photodetector in a reproduction signal A/D converter (ADC) is input, and
the laser noise adaptive equalizer has a configuration in which a digital signal obtained by conversion of, in a laser noise A/D converter (ADC), the laser noise signal obtained as an analog signal from the front monitor is input.

10. The information processing apparatus according to claim 9, wherein
a relationship between a sampling frequency of the reproduction signal A/D converter (ADC) (fs1) and a sampling frequency of the laser noise A/D converter (fs2) is represented by $fs2 \geq fs1$.

11. The information processing apparatus according to claim 1, wherein
the signal identification unit includes a binarization processing unit, and
the binarization processing unit is configured to execute a binarization process based on an output signal of the computing unit and generate the reproduction signal.

12. The information processing apparatus according to claim 11, wherein the binarization processing unit is further configured to execute a maximum likelihood decoding process as the binarization process with respect to the output signal of the computing unit.

13. The information processing apparatus according to claim 11, wherein the signal identification unit includes:
a partial response (PR) convolver configured to generate an equalization target signal based on a binary signal generated by the binarization processing unit; and
an equalization error computing unit configured to calculate an equalization error from the equalization target signal and the output signal of the computing unit, wherein
the equalization error is input to the reproduction signal adaptive equalizer; and
the adaptive equalization process is executed by the reproduction signal adaptive equalizer.

14. The information processing apparatus according to claim 1, wherein
the photodetector is further configured to output a plurality of signals corresponding to an amount of received light in a unit of a divided area,
an output of the photodetector is input to a matrix operation circuit,
the matrix operation circuit is further configured to output the plurality of signals corresponding to the amount of received light in the unit of the divided area of the photodetector,
the reproduction signal adaptive equalizer is a multiple input adaptive equalizer including a plurality of adaptive equalizers,
respective signals of the plurality of signals output from the matrix operation circuit are input to the plurality of adaptive equalizers, and
the plurality of adaptive equalizers output the equalization signal by the adaptive equalization process based on the input signal.

15. An optical storage apparatus comprising:
a photodetector configured to output a signal based on reflected light from a disk with respect to light emitted from a laser diode;
a front monitor configured to output a reference signal based on the light emitted from the laser diode; and
a data detection processing unit to which an output signal of the photodetector is input, wherein
the data detection processing unit is configured to generate a reproduction signal, and the data detection processing unit includes:
a reproduction signal adaptive equalizer to which the output signal of the photodetector is input, wherein the reproduction signal adaptive equalizer is configured to output an equalization signal by an adaptive equalization process based on an input signal;
a laser noise adaptive equalizer to which a laser noise signal included in the reference signal output from the front monitor is input, wherein the laser noise adaptive equalizer is configured to output the equalization signal by the adaptive equalization process based on the input signal;
a computing unit configured to execute an arithmetic operation on an output of the reproduction signal adaptive equalizer and an output of the laser noise adaptive equalizer; and
a signal identification unit configured to generate an identifying signal based on an output of the computing unit.

16. A method, comprising:
in an information processing apparatus:
controlling output of a signal based on reflected light from a disk with respect to light emitted from a laser diode using a photodetector;
controlling output of a reference signal based on the light emitted from the laser diode using a front monitor; and
executing a data detection process by inputting the output signal of the photodetector to a data detection processing unit and generating a reproduction signal using the data detection processing unit;
in the data detection process:
controlling generation of an equalization signal corresponding to the reproduction signal by an adaptive equalization process based on the output signal of the photodetector;
controlling generation of an equalization signal corresponding to laser noise by the adaptive equalization process based on a laser noise signal included in the reference signal output from the front monitor;
executing an arithmetic operation on the equalization signal corresponding to the reproduction signal and the equalization signal corresponding to the laser noise; and
controlling generation of an identifying signal based on the arithmetic operation.

* * * * *